US011950050B1

(12) United States Patent
Graham et al.

(10) Patent No.: US 11,950,050 B1
(45) **Date of Patent: *Apr. 2, 2024**

(54) CEILING TILE MICROPHONE

(71) Applicant: ClearOne, Inc., Salt Lake City, UT (US)

(72) Inventors: Derek Graham, South Jordan, UT (US); David K. Lambert, South Jordan, UT (US); Michael Braithwaite, Pflugerville, TX (US)

(73) Assignee: ClearOne, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,498

(22) Filed: Jan. 10, 2023

Related U.S. Application Data

(63) Continuation of application No. 16/872,557, filed on May 12, 2020, now Pat. No. 11,601,749, which is a (Continued)

(51) Int. Cl.
*H04R 1/40* (2006.01)
*G10L 21/0208* (2013.01)

(Continued)

(52) U.S. Cl.
CPC .......... *H04R 1/406* (2013.01); *G10L 21/0232* (2013.01); *H04R 1/08* (2013.01);

(Continued)

(58) Field of Classification Search
None
See application file for complete search history.

(56) References Cited

U.S. PATENT DOCUMENTS

| | | | |
|---|---|---|---|
| 4,319,088 | A | 3/1982 | Orfield |
| 4,330,691 | A | 5/1982 | Gordon |

(Continued)

FOREIGN PATENT DOCUMENTS

| | | | |
|---|---|---|---|
| CA | 2838856 | A1 | 12/2012 |
| CA | 2846323 | A1 | 9/2014 |

(Continued)

OTHER PUBLICATIONS

Advanced Network Devices, "IP Speaker—IPSCM", Feb. 2011, 2.

(Continued)

*Primary Examiner* — Kenny H Truong
(74) *Attorney, Agent, or Firm* — Matthew J Booth PC; Matthew J. Booth

(57) ABSTRACT

This disclosure describes an apparatus and method of an embodiment of an invention that is a ceiling tile microphone that includes: a plurality of microphones positioned at predetermined locations and coupled together as a microphone array used for beamforming; a single ceiling tile with an outer surface on the front side of the ceiling tile where the outer surface is acoustically transparent, the microphone array couples to the back side of the single ceiling tile, the microphone array combines with the ceiling tile as a single unit, the single unit is mountable in a drop ceiling in place of a single ceiling tile included in the drop ceiling, all or part of the single unit is in the drop space of the drop ceiling when the single unit is used in a drop ceiling mounting configuration; where the ceiling tile microphone further includes beamforming, acoustic echo cancellation, and auto mixing.

44 Claims, 16 Drawing Sheets

Related U.S. Application Data continuation of application No. 15/218,297, filed on Jul. 25, 2016, now Pat. No. 10,728,653, which is a continuation of application No. 14/475,849, filed on Sep. 3, 2014, now Pat. No. 9,813,806, which is a continuation of application No. 14/276,438, filed on May 13, 2014, now Pat. No. 9,294,839, which is a continuation of application No. 14/191,511, filed on Feb. 27, 2014, now abandoned.

(60) Provisional application No. 61/828,524, filed on May 29, 2013, provisional application No. 61/771,751, filed on Mar. 1, 2013.

(51) Int. Cl.

| | |
|---|---|
| ***G10L 21/0232*** | (2013.01) |
| ***H04R 1/08*** | (2006.01) |
| ***H04R 1/28*** | (2006.01) |
| ***H04R 3/00*** | (2006.01) |
| ***H04R 3/04*** | (2006.01) |
| ***H04R 17/02*** | (2006.01) |
| ***H04R 29/00*** | (2006.01) |
| ***H04R 31/00*** | (2006.01) |

(52) U.S. Cl.
CPC ........... *H04R 1/2876* (2013.01); *H04R 3/005* (2013.01); *H04R 3/04* (2013.01); *H04R 17/02* (2013.01); *H04R 29/005* (2013.01); *H04R 31/006* (2013.01); *G10L 2021/02082* (2013.01); *H04R 2201/021* (2013.01); *H04R 2420/07* (2013.01); *H04R 2430/21* (2013.01); *H04R 2430/23* (2013.01)

(56) References Cited

U.S. PATENT DOCUMENTS

| | | | | |
|---|---|---|---|---|
| 4,365,449 | A | 12/1982 | Liautaud | |
| 4,923,032 | A | 5/1990 | Nuernberger | |
| 5,008,574 | A | 4/1991 | Kitahata | |
| 6,332,029 | B1 | 12/2001 | Azima et al. | |
| 6,715,246 | B1 | 4/2004 | Frecska et al. | |
| 6,741,720 | B1 | 5/2004 | Myatt | |
| 6,944,312 | B2 | 9/2005 | Mason et al. | |
| 8,061,359 | B2 | 11/2011 | Emanuel | |
| 8,213,634 | B1 | 7/2012 | Daniel | |
| 8,229,134 | B2 | 7/2012 | Duraiswami et al. | |
| 8,259,959 | B2 | 9/2012 | Marton et al. | |
| 8,286,749 | B2 | 10/2012 | Stewart, Jr. et al. | |
| 8,297,402 | B2 | 10/2012 | Stewart et al. | |
| 8,403,107 | B2 | 3/2013 | Stewart, Jr. et al. | |
| 8,472,640 | B2 | 6/2013 | Marton | |
| 8,479,871 | B2 | 7/2013 | Stewart et al. | |
| 8,515,109 | B2 | 8/2013 | Dittberner et al. | |
| 8,631,897 | B2 | 1/2014 | Stewart, Jr. et al. | |
| 8,672,087 | B2 | 3/2014 | Stewart, Jr. et al. | |
| 9,565,493 | B2 | 2/2017 | Abraham et al. | |
| 9,813,806 | B2 | 11/2017 | Graham et al. | |
| 9,826,211 | B2 | 11/2017 | Sawa et al. | |
| 9,860,439 | B2 | 1/2018 | Sawa et al. | |
| 10,075,801 | B2 | 9/2018 | Sako et al. | |
| 10,397,697 | B2 * | 8/2019 | Lambert | H04R 3/005 |
| 10,728,653 | B2 | 7/2020 | Graham et al. | |
| 11,240,597 | B1 | 2/2022 | Graham et al. | |
| 11,240,598 | B2 | 2/2022 | Lambert et al. | |
| 11,297,420 | B1 | 4/2022 | Graham et al. | |
| 11,303,996 | B1 | 4/2022 | Graham et al. | |
| 11,601,749 | B1 | 3/2023 | Graham et al. | |
| 2002/0159603 | A1 | 10/2002 | Hirai et al. | |
| 2003/0048910 | A1 | 3/2003 | Roy et al. | |
| 2003/0107478 | A1 | 6/2003 | Hendricks et al. | |
| 2003/0118200 | A1 | 6/2003 | Beaucoup et al. | |
| 2003/0185404 | A1 | 10/2003 | Milsap | |
| 2006/0088173 | A1 | 4/2006 | Rodman et al. | |
| 2006/0147051 | A1 | 7/2006 | Smith et al. | |
| 2007/0189556 | A1 | 8/2007 | Tsuchiya | |
| 2007/0273550 | A1 | 11/2007 | Price et al. | |
| 2008/0168283 | A1 | 7/2008 | Penning | |
| 2008/0192953 | A1 | 8/2008 | Opfer | |
| 2008/0253589 | A1 | 10/2008 | Trahms | |
| 2008/0260175 | A1 | 10/2008 | Elko | |
| 2009/0147967 | A1 | 6/2009 | Ishibashi et al. | |
| 2009/0173030 | A1 | 7/2009 | Gulbrandsen | |
| 2009/0173570 | A1 | 7/2009 | Levit et al. | |
| 2010/0119097 | A1 | 5/2010 | Ohtsuka | |
| 2010/0215189 | A1 | 8/2010 | Marton | |
| 2011/0007921 | A1 | 1/2011 | Stewart, Jr. et al. | |
| 2011/0096631 | A1 | 4/2011 | Kondo et al. | |
| 2011/0268287 | A1 | 11/2011 | Ishibashi | |
| 2011/0311085 | A1 | 12/2011 | Stewart, Jr. et al. | |
| 2012/0002835 | A1 | 1/2012 | Stewart, Jr. et al. | |
| 2012/0076316 | A1 | 3/2012 | Zhu et al. | |
| 2012/0080260 | A1 | 4/2012 | Stewart, Jr. et al. | |
| 2012/0155688 | A1 | 6/2012 | Wilson | |
| 2012/0169826 | A1 | 7/2012 | Jeong et al. | |
| 2012/0224709 | A1 | 9/2012 | Keddem et al. | |
| 2012/0327115 | A1 | 12/2012 | Chhetri et al. | |
| 2013/0004013 | A1 | 1/2013 | Stewart, Jr. et al. | |
| 2013/0015014 | A1 | 1/2013 | Stewart et al. | |
| 2013/0016847 | A1 | 1/2013 | Steiner | |
| 2013/0029684 | A1 | 1/2013 | Kawaguchi et al. | |
| 2013/0101141 | A1 | 4/2013 | Mcelveen | |
| 2013/0147835 | A1 | 6/2013 | Lee et al. | |
| 2013/0206501 | A1 | 8/2013 | Yu et al. | |
| 2013/0251181 | A1 | 9/2013 | Stewart, Jr. et al. | |
| 2013/0264144 | A1 | 10/2013 | Hudson et al. | |
| 2013/0336516 | A1 | 12/2013 | Stewart et al. | |
| 2013/0343549 | A1 | 12/2013 | Vemireddy et al. | |
| 2014/0037097 | A1 | 2/2014 | LaBosco | |
| 2014/0098964 | A1 | 4/2014 | Rosca et al. | |
| 2014/0233778 | A1 | 8/2014 | Hardiman et al. | |
| 2014/0265774 | A1 | 9/2014 | Stewart, Jr. et al. | |
| 2014/0286518 | A1 | 9/2014 | Stewart, Jr. et al. | |
| 2014/0301586 | A1 | 10/2014 | Stewart, Jr. et al. | |
| 2014/0341392 | A1 | 11/2014 | Lambert et al. | |
| 2014/0357177 | A1 | 12/2014 | Stewart, Jr. et al. | |
| 2015/0078582 | A1 | 3/2015 | Graham et al. | |
| 2016/0302002 | A1 | 10/2016 | Lambert et al. | |
| 2017/0134850 | A1 * | 5/2017 | Graham | H04R 17/02 |
| 2018/0160224 | A1 | 6/2018 | Graham et al. | |
| 2019/0371353 | A1 | 12/2019 | Lambert et al. | |
| 2022/0353609 | A1 | 11/2022 | Graham et al. | |
| 2022/0353610 | A1 | 11/2022 | Graham et al. | |

FOREIGN PATENT DOCUMENTS

| | | | |
|---|---|---|---|
| CN | 102821336 | A | 12/2012 |
| CN | 102833664 | A | 12/2012 |
| CN | 104080289 | A | 10/2014 |
| CN | 102821336 | B | 1/2015 |
| DE | 10337181 | B4 | 6/2005 |
| DE | 102004048988 | A1 | 4/2006 |
| DE | 102006045385 | A1 | 9/2020 |
| EP | 2721837 | A1 | 4/2014 |
| EP | 2778310 | A1 | 9/2014 |
| JP | 3314730 | B2 | 8/2002 |
| JP | 2006279298 | A | 10/2006 |
| JP | 2007274131 | A | 10/2007 |
| JP | 2008242398 | A | 10/2008 |
| KR | 100901464 | B1 | 6/2009 |
| WO | 9911184 | A1 | 3/1999 |
| WO | 2011104501 | A2 | 9/2011 |
| WO | 2012152588 | A1 | 11/2012 |
| WO | 2012160459 | A1 | 11/2012 |
| WO | 2012174159 | A1 | 12/2012 |

OTHER PUBLICATIONS

Armstrong, "Excerpts from Armstrong, 2011 2012 Ceiling Wall Systems Catalog", *Shure, Inc.* v. *ClearOne, Inc.*, PGR2020-00079 (P.T.A.B.), Exhibit 1019, As early as 2012, 162.

(56) References Cited

OTHER PUBLICATIONS

Audix Microphones, “Audix Introduces Innovative Ceiling Mics”, Jun. 2011, 6.
Benesty, J., et al, “Microphone Array Signal Processing,” pp. 1-7 & 39-65 Springer (2010).
Brandstein, et al., “Microphone Arrays: Signal Processing Techniques and Applications”, Digital Signal Processing, Springer-Verlag Berlin Heidelberg, 2001, pp. 1-401, 2001, pp. 1-401.
Clearone, Inc., “Beamforming Microphone Array”, Mar. 2012, 6.
Clearone, Inc., “Ceiling Microphone Array Installation Manual”, Jan. 9, 2012, 20.
CTG Audio, “Ceiling Microphone CTG CM-01”, CTG Ceiling Microphone CM-01 data sheet, Jun. 5, 2008, 2.
CTG Audio, “CTG FS-400 and RS-800 with “Beamforming” Technology Datasheet”, CTG FS-400 and RS-800 with “Beamforming” Technology Datasheet, As early as 2009, 2.
CTG Audio, “CTG User Manual for the FS-400/800 Beamforming Mixers”, CTG User Manual for the FS-400/800 Beamforming Mixers, Nov. 21, 2008, 26.
CTG Audio, “Installation Manual”, Nov. 21, 2008, 25.
DCT 1:17-cv-03078 Doc. No. 0279, “Memorandum Opinion and Order”, *Shure, Inc.* v. *ClearOne, Inc.* 1:17-cv-03078 (N.D. Ill—Eastern Division), Document No. 0279, Mar. 16, 2018, 50.
DCT 1:17-cv-03078 Doc. No. 0295, “Motion by Counter Claimant ClearOne Inc. for Preliminary Injunction”, *Shure, Inc.* v. *ClearOne, Inc.* 1:17-cv-03078 (N.D. Ill—Eastern Division), Document No. 0295, Apr. 17, 2018, 31.
DCT 1:17-cv-03078 Doc. No. 0307, “Shure Incorporated’s Initial Non-Infringement, Unenforceability, and Invalidity Contentions related to U.S. Pat. No. 9,813,806 Pursuant to Local Patent Rule 2.3”, *Shure, Inc.* v. *ClearOne, Inc.* 1:17-cv-03078 (N.D. Ill—Eastern Division), Document No. 0307, Apr. 23, 2018, 116.
DCT 1:17-cv-03078 Doc. No. 0310, “Clearone, Inc.’S Response to Shure Incorporated’s Initial Invalidity Contentions Related to U.S. Pat. No. 9,813,806 ”, May 9, 2018, 9.
DCT 1:17-cv-03078 Doc. No. 0350, “Shure Incorporated’s Non-Infringement, Unenforceability, and Invalidity Contentions Related to U.S. Pat. No. 9,813,806 For Purposes of the Preliminary Injunction”, Sep. 10, 2018, 37.
DCT 1:17-cv-03078 Doc. No. 0350-1, “Shure Contentions—Ex. A”, Sep. 10, 2018, 12.
DCT 1:17-cv-03078 Doc. No. 0350-2, “Shure Contentions—Ex. B”, Sep. 10, 2018, 73.
DCT 1:17-cv-03078 Doc. No. 0372, “Declaration of Dan Schonfeld”, Sep. 25, 2018, 35.
DCT 1:17-cv-03078 Doc. No. 0372-1, “Declaration of Dan Schonfeld—Ex. A”, Sep. 25, 2018, 95.
DCT 1:17-cv-03078 Doc. No. 0372-2, “Declaration of Dan Schonfeld—Ex. B”, Sep. 25, 2018, 6.
DCT 1:17-cv-03078 Doc. No. 0372-3, “Declaration of Dan Schonfeld—Ex. C”, Sep. 25, 2018, 7.
DCT 1:17-cv-03078 Doc. No. 0372-4, “Declaration of Dan Schonfeld—Ex. D”, Sep. 25, 2018, 52.
DCT 1:17-cv-03078 Doc. No. 0393, “Shure Incorporated’s Amended Contentions for Purposes of Clearone’s Motion for Preliminary Injunction Related to U.S. Pat. No. 9,813,806”, Oct. 10, 2018, 22.
DCT 1:17-cv-03078 Doc. No. 0393-1, “Shure’s Amended Contentions for Purposes of Clearone’s Motion for Preliminary Injunction Related to U.S. Pat. No. 9,813,806—Ex. 1”, Oct. 10, 2018, 47.
DCT 1:17-cv-03078 Doc. No. 0399, “Shure’s Amended Final Contentions for Purposes of Clearone’s Motion for Preliminary Injunction Related to U.S. Pat. No. 9,813,806”, Oct. 11, 2018, 22.
DCT 1:17-cv-03078 Doc. No. 0399-1, “Shure’s Amended Final Contentions for Purposes of Clearone’s Motion for Preliminary Injunction Related to U.S. Pat. No. 9,813,806—Ex. 1”, Oct. 11, 2018, 47.
DCT 1:17-cv-03078 Doc. No. 0402, “Shure’s Memo in Opposition to Clearone’s Motion for Prelim. Injunction (’806 Patent)”, Oct. 24, 2018, 50.
DCT 1:17-cv-03078 Doc. No. 0403, “Declaration of Brian Donahoe”, Oct. 24, 2018, 5.
DCT 1:17-cv-03078 Doc. No. 0403-1, “Declaration of Brian Donahoe—Ex. A”, Oct. 24, 2018, 3.
DCT 1:17-cv-03078 Doc. No. 0403-2, “Declaration of Brian Donahoe—Ex. B”, Oct. 24, 2018, 1.
DCT 1:17-cv-03078 Doc. No. 0403-3, “Declaration of Brian Donahoe—Ex. C”, Oct. 24, 2018, 8.
DCT 1:17-cv-03078 Doc. No. 0403-4, “Declaration of Brian Donahoe—Ex. D” , Oct. 24, 2018, 1.
DCT 1:17-cv-03078 Doc. No. 0403-5, “Declaration of Brian Donahoe—Ex. E”, Oct. 24, 2018, 2.
DCT 1:17-cv-03078 Doc. No. 0403-6, “Declaration of Brian Donahoe—Ex. F”, Oct. 24, 2018, 2.
DCT 1:17-cv-03078 Doc. No. 0403-7, “Declaration of Brian Donahoe—Ex. G”, Oct. 24, 2018, 2.
DCT 1:17-cv-03078 Doc. No. 0403-8, “Declaration of Brian Donahoe—Ex. H”, Oct. 24, 2018, 2.
DCT 1:17-cv-03078 Doc. No. 0403-9, “Declaration of Brian Donahoe—Ex. I”, Oct. 24, 2018, 2.
DCT 1:17-cv-03078 Doc. No. 0404, “Declaration of Bruce Marlin”, Oct. 24, 2018, 6.
DCT 1:17-cv-03078 Doc. No. 0404-1, “Declaration of Bruce Marlin—Ex. A”, Oct. 24, 2018, 3.
DCT 1:17-cv-03078 Doc. No. 0404-2, “Declaration of Bruce Marlin—Ex. B”, Oct. 24, 2018, 6.
DCT 1:17-cv-03078 Doc. No. 0404-3, “Declaration of Bruce Marlin—Ex. C”, Oct. 24, 2018, 1.
DCT 1:17-cv-03078 Doc. No. 0404-4, “Declaration of Bruce Marlin—Ex. D”, Oct. 24, 2018, 1.
DCT 1:17-cv-03078 Doc. No. 0405-00, “Declaration of Dave Newman”, Oct. 24, 2018, 7.
DCT 1:17-cv-03078 Doc. No. 0405-01, “Declaration of Dave Newman—Ex. A”, Oct. 24, 2018, 5.
DCT 1:17-cv-03078 Doc. No. 0405-02, “Declaration of Dave Newman—Ex. B”, Oct. 24, 2018, 1.
DCT 1:17-cv-03078 Doc. No. 0405-03, “Declaration of Dave Newman—Ex. C”, Oct. 24, 2018, 3.
DCT 1:17-cv-03078 Doc. No. 0405-04, “Declaration of Dave Newman—Ex. D”, Oct. 24, 2018, 1.
DCT 1:17-cv-03078 Doc. No. 0405-05, “Declaration of Dave Newman—Ex. E”, Oct. 24, 2018, 3.
DCT 1:17-cv-03078 Doc. No. 0405-06, “Declaration of Dave Newman—Ex. F”, Oct. 24, 2018, 10.
DCT 1:17-cv-03078 Doc. No. 0405-07, “Declaration of Dave Newman—Ex. G”, Oct. 24, 2018, 2.
DCT 1:17-cv-03078 Doc. No. 0405-08, “Declaration of Dave Newman—Ex. H”, Oct. 24, 2018, 3.
DCT 1:17-cv-03078 Doc. No. 0405-09, “Declaration of Dave Newman—Ex. I”, Oct. 24, 2018, 28.
DCT 1:17-cv-03078 Doc. No. 0405-10, “Declaration of Dave Newman—Ex. J”, Oct. 24, 2018, 10.
DCT 1:17-cv-03078 Doc. No. 0406-0, “Declaration of Dr. Kenneth Roy”, Oct. 24, 2018, 53.
DCT 1:17-cv-03078 Doc. No. 0406-1, “Declaration of Dr. Kenneth Roy—Ex. A”, Oct. 24, 2018, 16.
DCT 1:17-cv-03078 Doc. No. 0406-2, “Declaration of Dr. Kenneth Roy—Ex. B”, Oct. 24, 2018, 3.
DCT 1:17-cv-03078 Doc. No. 0407-0, “Declaration of Dr. Wilfrid Leblanc”, Oct. 24, 2018, 25.
DCT 1:17-cv-03078 Doc. No. 0407-1, “Declaration of Dr. Wilfrid Leblanc—Ex. A”, Oct. 24, 2018, 14.
DCT 1:17-cv-03078 Doc. No. 0407-2, “Declaration of Dr. Wilfrid Leblanc—Ex. B”, Oct. 24, 2018, 2.
DCT 1:17-cv-03078 Doc. No. 0408-0, “Declaration of Nicholas P. Godici”, Oct. 24, 2018, 36.
DCT 1:17-cv-03078 Doc. No. 0408-1, “Declaration of Nicholas P. Godici—Ex. A”, Oct. 24, 2018, 4.
DCT 1:17-cv-03078 Doc. No. 0408-2, “Declaration of Nicholas P. Godici—Ex. B”, Oct. 24, 2018, 3.
DCT 1:17-cv-03078 Doc. No. 0408-3, “Declaration of Nicholas P. Godici—Ex. C”, Oct. 24, 2018, 2.

(56) References Cited

OTHER PUBLICATIONS

DCT 1:17-cv-03078 Doc. No. 0408-4 (part 1), "Declaration of Nicholas P. Godici—Ex. D", Oct. 24, 2018, 205.
DCT 1:17-cv-03078 Doc. No. 0408-4 (part 2), "Declaration of Nicholas P. Godici—Ex. D", Oct. 24, 2018, 205.
DCT 1:17-cv-03078 Doc. No. 0410 "Declaration of Chad Wiggins for the '806 Preliminary Injunction", Oct. 24, 2018, 11.
DCT 1:17-cv-03078 Doc. No. 0411, "Declaration of Tanvi Patel ISO Shure's Reply to ClearOne's Motion for Preliminary Injunction", Oct. 24, 2018, 12.
DCT 1:17-cv-03078 Doc. No. 0412-0, "Patel" , Oct. 24, 2018, 147.
DCT 1:17-cv-03078 Doc. No. 0412-1, "Patel—Ex. 9" , Oct. 24, 2018, 122.
DCT 1:17-cv-03078 Doc. No. 0412-2, "Patel—Ex. 21", Oct. 24, 2018, 201.
DCT 1:17-cv-03078 Doc. No. 0412-3 (part 1), "Patel—Ex. 38", Oct. 24, 2018, 81.
DCT 1:17-cv-03078 Doc. No. 0412-3 (part 2), "Patel—Ex. 38", Oct. 24, 2018, 81.
DCT 1:17-cv-03078 Doc. No. 0412-4, "Patel—Ex. 60" , Oct. 24, 2018, 63.
DCT 1:17-cv-03078 Doc. No. 0412-5, "Patel—Ex. 86", Oct. 24, 2018, 51.
DCT 1:17-cv-03078 Doc. No. 0419, "Joint Claim Construction Chart" , Oct. 24, 2018, 2.
DCT 1:17-cv-03078 Doc. No. 0419-1, "Joint Claim Construction Chart—Ex. A" , Oct. 24, 2018, 1.
DCT 1:17-cv-03078 Doc. No. 0440, "ClearOne's Reply ISO Its Motion for Preliminary Injunction", Nov. 7, 2018, 29.
DCT 1:17-cv-03078 Doc. No. 0441-0, "Giza Declaration ISO ClearOne's Reply ISO Its Motion for Preliminary Injunction", Nov. 7, 2018, 3.
DCT 1:17-cv-03078 Doc. No. 0441-1, "Giza Declaration ISO ClearOne's Reply ISO Its Motion for Preliminary Injunction—Ex. 133", Nov. 7, 2018, 133.
DCT 1:17-cv-03078 Doc. No. 0509-0, "Declaration of Dr. Wildrid Leblanc, Ph. D.", May 7, 2019, 30.
DCT 1:17-cv-03078 Doc. No. 0509-1, "Declaration of Dr. Wildrid Leblanc, Ph. D.—Ex. 1", May 7, 2019, 5.
DCT 1:17-cv-03078 Doc. No. 0509-2, "Declaration of Dr. Wildrid Leblanc, Ph. D.—Ex. 2" , May 7, 2019, 4.
DCT 1:17-cv-03078 Doc. No. 0509-3, "Declaration of Dr. Wildrid Leblanc, Ph. D.—Ex. 3", May 7, 2019, 33.
DCT 1:17-cv-03078 Doc. No. 0520, "ClearOne's Responsive Claim Construction Brief Pursuant to Local Patent Rule 4.2", Jun. 4, 2019, 42.
DCT 1:17-cv-03078 Doc. No. 0521-0, "Declaration of Dan Schonfeld ISO ClearOne's Claim Construction Brief", Jun. 4, 2019, 24.
DCT 1:17-cv-03078 Doc. No. 0521-1, "Declaration of Dan Schonfeld ISO ClearOne's Claim Construction Brief—Ex. A", Jun. 4, 2019, 97.
DCT 1:17-cv-03078 Doc. No. 0521-2, "Declaration of Dan Schonfeld ISO ClearOne's Claim Construction Brief—Ex. B", Jun. 4, 2019, 7.
DCT 1:17-cv-03078 Doc. No. 0523-0, "Declaration of Rayburn ISO ClearOne's Responsive Claim Construction Brief", Jun. 4, 2019, 5.
DCT 1:17-cv-03078 Doc. No. 0523-1, "Declaration of Rayburn ISO ClearOne's Responsive Claim Construction Brief—Ex. C", Jun. 4, 2019, 399.
DCT 1:17-cv-03078 Doc. No. 0535, "Shure's Claim Construction Reply Brief", Jun. 25, 2019, 20.
DCT 1:17-cv-03078 Doc. No. 0535-1, "Shure's Claim Construction Reply Brief—Ex. D", Jun. 25, 2019, 109.
DCT 1:17-cv-03078 Doc. No. 0536, "Joint Claim Construction Chart", Jul. 2, 2019, 4.
DCT 1:17-cv-03078 Doc. No. 0536-1, "Joint Claim Construction Chart—Ex. A", Jul. 2, 2019, 3.
DCT 1:17-cv-03078 Doc. No. 0551, "Memorandum Opinion and Order for Preliminary Injunction", *Shure, Inc.* v. *ClearOne, Inc.* 1:17-cv-03078 (N.D. III—Eastern Division), Document No. 0551, Aug. 5, 2019, 65.
DCT 1:17-cv-03078 Doc. No. 0613, "Memorandum Opinion and Order on Claim Construction", *Shure, Inc.* v. *ClearOne, Inc.* 1:17-cv-03078 (N.D. III—Eastern Division), Document No. 613, Aug. 25, 2019, 20.
DCT 1:17-cv-03078 Doc. No. 0617-0, "Jt. Motion for Proposed Redactions of the Court's Preliminary Injunction Order ('806 Patent)", Aug. 26, 2019, 5.
DCT 1:17-cv-03078 Doc. No. 0617-1, "Jt. Motion for Proposed Redactions of the Court's Preliminary Injunction Order ('806 Patent)—Ex. 1", Aug. 26, 2019, 66.
DCT 1:17-cv-03078 Doc. No. 0637, "Memo ISO Shure's Motion for Leave to Amend Final Invalidity and Non-Infringement Contentions", Sep. 6, 2019, 11.
DCT 1:17-cv-03078 Doc. No. 0638, "Shure's Suppl. Final Invalidity and Non-Infringement Contentions as to the '186 Pat. and the Final Invalidity Contentions as to the '806 Pat." , Sep. 6, 2019, 22.
DCT 1:17-cv-03078 Doc. No. 0651-0, "Jt. Motion and Stipulation Regarding Shure's Pending Motion for Leave to Amend Final Invalidity and Non-Infringement Contentions", Sep. 16, 2019, 3.
DCT 1:17-cv-03078 Doc. No. 0651-1, "Jt. Motion and Stipulation Regarding Shure's Pending Motion for Leave to Amend Final Invalidity and Non-Infringement Contentions—Ex. 1" , Sep. 16, 2019, 22.
DCT 1:17-cv-03078 Doc. No. 0695, "Memorandum in support of Shure Incorporated's Motion to Supplement Final Invalidity Contentions as to the '186 Patent", *Shure, Inc.* v. *ClearOne, Inc.* 1:17-cv-03078 (N.D. III—Eastern Division), Document No. 695, Dec. 30, 2019, 116.
DCT 1:17-cv-03078 Doc. No. 0702, "Clearone's Opposition to Shure's Motion to Supplement Final Invalidity Contentions as to the '186 Patent", *Shure, Inc.* v. *ClearOne, Inc.* 1:17-cv-03078 (N.D. III—Eastern Division), Document No. 702, Jan. 13, 2020, 142.
DCT 1:17-cv-03078 Doc. No. 0848, "Shure's Motion for Summary Judgment on Invalidity", Jul. 9, 2020, 3.
DCT 1:17-cv-03078 Doc. No. 0849, "Shure Incorporated's Memorandum of Law in Support of Its Motion for Summary Judgment on Invalidity", *Shure, Inc.* v. *ClearOne, Inc.* 1:17-cv-03078 (N.D. III—Eastern Division), Document No. 849, Jul. 9, 2020, 50.
DCT 1:17-cv-03078 Doc. No. 0850, "Shure's Statement of Uncontested Material Facts", *Shure, Inc.* v. *ClearOne, Inc.* 1:17-cv-03078 (N.D. III—Eastern Division), Document No. 850, Jul. 9, 2020, 22.
DCT 1:17-cv-03078 Doc. No. 0851-0, "Declaration of Bradley Rademaker ISO Shure's Motions for Summary Judgment", Jul. 9, 2020, 11.
DCT 1:17-cv-03078 Doc. No. 0851-1, "Declaration of Bradley Rademaker ISO Shure's Motions for Summary Judgment—Ex. 1", Jul. 9, 2020, 22.
DCT 1:17-cv-03078 Doc. No. 0851-2, "Declaration of Bradley Rademaker ISO Shure's Motions for Summary Judgment—Ex. 2", Jul. 9, 2020, 2.
DCT 1:17-cv-03078 Doc. No. 0851-3, "Declaration of Bradley Rademaker ISO Shure's Motions for Summary Judgment—Ex. 3", Jul. 9, 2020, 75.
DCT 1:17-cv-03078 Doc. No. 0851-4, "Declaration of Bradley Rademaker ISO Shure's Motions for Summary Judgment—Ex. 4", Jul. 9, 2020, 1.
DCT 1:17-cv-03078 Doc. No. 0851-5, "Declaration of Bradley Rademaker ISO Shure's Motions for Summary Judgment—Ex. 5", Jul. 9, 2020, 1.
DCT 1:17-cv-03078 Doc. No. 0851-6, "Declaration of Bradley Rademaker ISO Shure's Motions for Summary Judgment—Ex. 6", Jul. 9, 2020, 58.
DCT 1:17-cv-03078 Doc. No. 0851-7, "Declaration of Bradley Rademaker ISO Shure's Motions for Summary Judgment—Ex. 7", Jul. 9, 2020, 87.
DCT 1:17-cv-03078 Doc. No. 0851-8, "Declaration of Bradley Rademaker ISO Shure's Motions for Summary Judgment—Ex. 8", Jul. 9, 2020, 70.
DCT 1:17-cv-03078 Doc. No. 0852-05, "ClearOne's Amended Final Patent Enforceability and Validity Contentions for the Graham Patent", *Shure, Inc.* v. *ClearOne, Inc.* 1:17-cv-03078 (N.D. III—Eastern Division), Document No. 852-05, Jul. 9, 2020, 74.

(56) References Cited

OTHER PUBLICATIONS

DCT 1:17-cv-03078 Doc. No. 0852-18, "Larry S. Nixon Expert Report", *Shure, Inc.* v. *ClearOne, Inc.* 1:17-cv-03078 (N. D. III—Eastern Division), Document No. 852-18, Jul. 9, 2020, 143.
DCT 1:17-cv-03078 Doc. No. 0852-20, "Deposition Transcript of Larry Nixon", *Shure, Inc.* v. *ClearOne, Inc.* 1:17- cv-03078 (N.D. III—Eastern Division), Document No. 852-20, Jul. 9, 2020, 84.
DCT 1:17-cv-03078 Doc. No. 0880, "Declaration of Dan Schonfeld ISO ClearOne's Motion for Summary Judgement", Jul. 9, 2020, 167.
DCT 1:17-cv-03078 Doc. No. 0888-0, "ClearOne's Cross Motion for Summary Judgment of U.S. Pat. Nos. 9,635,186 & 9,813,806", Aug. 12, 2020, 5.
DCT 1:17-cv-03078 Doc. No. 0888-1, "[Proposed] Order Granting ClearOne's Cross Motion For Summary Judgement of Validity and Enforceability of U.S. Pat. Nos. 9,635,186 & 9,813,806", Aug. 12, 2020, 1.
DCT 1:17-cv-03078 Doc. No. 0896, "ClearOne's Statement of Undisputed Material Facts", *Shure, Inc.* v. *ClearOne, Inc.* 1:17-cv-03078 (N.D. III—Eastern Division), Document No. 896, Aug. 12, 2020, 48.
DCT 1:17-cv-03078 Doc. No. 0897, "ClearOne's Response to Shure's Statement of Uncontested Material Facts", *Shure, Inc.* v. *ClearOne, Inc.* 1:17-cv-03078 (N.D. III—Eastern Division), Document No. 897, Aug. 12, 2020, 27.
DCT 1:17-cv-03078 Doc. No. 0898, "Clearone's Opposition to Shure's Motion for Summary Judgment on Invalidity and Memorandum in Support of Its Cross Motion for Summary Judgment of Validity and Enforceability of U.S. Patent Nos. 9,635,186 and 9,813,806", *Shure, Inc.* v. *ClearOne, Inc.* 1:17-cv-03078 (N.D. III—Eastern Division), Document No. 898, Aug. 12, 2020, 93.
DCT 1:17-cv-03078 Doc. No. 0899, "Rayburn Decl. ISO Memo ISO ClearOne's Opp. to Shure's Mot. for Summary Judgment" , Aug. 12, 2020, 13.
DCT 1:17-cv-03078 Doc. No. 0899-01, "Rayburn Decl. ISO Memo ISO ClearOne's Opp. to Shure's Mot. for Summary Judgment—Ex. 238" , Aug. 12, 2020, 86.
DCT 1:17-cv-03078 Doc. No. 0899-08, "Rayburn Decl. ISO Memo ISO ClearOne's Opp. to Shure's Mot. for Summary Judgment—Ex. 253", Aug. 12, 2020, 26.
DCT 1:17-cv-03078 Doc. No. 0899-10, "Rayburn Decl. ISO Memo ISO ClearOne's Opp. to Shure's Mot. for Summary Judgment—Ex. 256", Aug. 12, 2020, 36.
DCT 1:17-cv-03078 Doc. No. 0899-14, "Rayburn Decl. ISO Memo ISO ClearOne's Opp. to Shure's Mot. for Summary Judgment—Ex. 261" , Aug. 12, 2020, 37.
DCT 1:17-cv-03078 Doc. No. 0899-15, "Rayburn Decl. ISO Memo ISO ClearOne's Opp. to Shure's Mot. for Summary Judgment—Ex. 267", Aug. 12, 2020, 8.
DCT 1:17-cv-03078 Doc. No. 0899-16, "Rayburn Decl. ISO Memo ISO ClearOne's Opp. to Shure's Mot. for Summary Judgment—Ex. 268", Aug. 12, 2020, 17.
DCT 1:17-cv-03078 Doc. No. 0899-17 (part 1), "Rayburn Decl. ISO Memo ISO ClearOne's Opp. to Shure's Mot. for Summary Judgment—Ex. 272", Part 1, Aug. 12, 2020, 350.
DCT 1:17-cv-03078 Doc. No. 0899-17 (part 2), "Rayburn Decl. ISO Memo ISO ClearOne's Opp. to Shure's Mot. for Summary Judgment—Ex. 272", Part 2, Aug. 12, 2020, 309.
DCT 1:17-cv-03078 Doc. No. 0899-18 (part 1), "Rayburn Decl. ISO Memo ISO ClearOne's Opp. to Shure's Mot. for Summary Judgment—Ex. 273", Aug. 12, 2020, 250.
DCT 1:17-cv-03078 Doc. No. 0899-18 (part 2), "Rayburn Decl. ISO Memo ISO ClearOne's Opp. to Shure's Mot. for Summary Judgment—Ex. 273", Aug. 12, 2020, 257.
DCT 1:17-cv-03078 Doc. No. 0901-1, "Shure's Consolidated Final Unenforceability and Invalidity Contentions Related to U.S. Pat. No. 9,813,806", *Shure, Inc.* v. *ClearOne, Inc.* 1:17-cv-03078 (N.D. III—Eastern Division), Document No. 0901-01, Aug. 12, 2020, 44.
DCT 1:17-cv-03078 Doc. No. 0901-2, "Shure's Supplemental Final Invalidity and Non-Infringement Contentions as to the '186 Patent and Final Invalidity Contentions as to the '806 Patent After Claim Construction", *Shure, Inc.* v. *ClearOne, Inc.* 1:17-cv-03078 (N.D. III—Eastern Division), Document No. 901-2, Aug. 12, 2020, 23.
DCT 1:17-cv-03078 Doc. No. 0901-3 Ex 196, "Opening Expert Report of Dr. Wilfrid Leblanc", *Shure, Inc.* v. *ClearOne, Inc.* 1:17-cv-03078 (N.D. III—Eastern Division), Document No. 901-3 (Exhibit 196), Aug. 12, 2020, 609.
DCT 1:17-cv-03078 Doc. No. 0901-3 Ex 198, "Shure's Consolidated Final Unenforceability and Invalidity Contentions", *Shure, Inc.* v. *ClearOne, Inc.* 1:17-cv-03078 (N.D. III—Eastern Division), Document No. 901-3 (Exhibit 198), Aug. 12, 2020, 64.
DCT 1:17-cv-03078 Doc. No. 0901-3 Ex 199, "Rebuttal Report prepared of Dan Schonfeld", *Shure, Inc.* v. *ClearOne, Inc.* 1:17-cv-03078 (N.D. III—Eastern Division), Document No. 0901-3 (Exhibit 199), Aug. 12, 2020, 126.
DCT 1:17-cv-03078 Doc. No. 0902, "Shure's Response to ClearOne's Statement of Facts", *Shure, Inc.* v. *ClearOne, Inc.* 1:17-cv-03078 (N.D. III—Eastern Division), Document No. 902, Aug. 12, 2020, 83.
DCT 1:17-cv-03078 Doc. No. 0906, "Rademaker Dec.—Ex. 214", Aug. 13, 2020, 26.
DCT 1:17-cv-03078 Doc. No. 0912, "Memorandum Opinion and Order", *Shure, Inc.* v. *ClearOne, Inc.* 1:17- cv-03078 (N.D. III—Eastern Division), Document No. 912, Sep. 1, 2020, 35.
DCT 1:17-cv-03078 Doc. No. 0914, "Shure's Combined Reply and Response to ClearOne's Cross-Motion for Summary Judgment on Issues Relating to Invalidity and Unenforceability", *Shure, Inc.* v. *ClearOne, Inc.* 1:17-cv-03078 (N.D. III—Eastern Division), Document No. 914, Sep. 11, 2020, 70.
DCT 1:17-cv-03078 Doc. No. 0915, "Shure's Support of Its Combined Reply and Response to ClearOne's Cross Motion for Summary Judgment on Issues Relating to Invalidity and Unenforceability", *Shure, Inc.* v. *ClearOne, Inc.* 1:17-cv-03078 (N.D. III—Eastern Division), Document No. 915, Sep. 11, 2020, 29.
DCT 1:17-cv-03078 Doc. No. 0916, "Shure's Response to ClearOne's Statement of Fact Nos. 81-200", Sep. 11, 2020, 81.
DCT 1:17-cv-03078 Doc. No. 0950, "ClearOne's Reply in Support of its MSJ of Validity and Enforceability of USPN '186 and '806", *Shure, Inc.* v. *ClearOne, Inc.* 1:17-cv-03078 (N.D. III—Eastern Division), Document No. 950, Sep. 29, 2020, 27.
DCT 1:17-cv-03078 Doc. No. 0951, "ClearOne's Responses to Shure's Statement of Uncontested Facts", *Shure, Inc.* v. *ClearOne, Inc.* 1:17-cv-03078 (N.D. III—Eastern Division), Document No. 951, Sep. 29, 2020, 40.
Fed Cir Appeal 21-1024 Doc No. 17, "Plaintiff-Appellant's Opening Brief", *Shure, Inc.* v. *ClearOne, Inc.*, 21-1024 (Fed. Cir. 2020), Document No. 17, Dec. 30, 2020, 136.
Fed Cir Appeal 21-1024 Doc No. 32, "Non-Confidential Response Brief of Defendant-Appellee Clearone, Inc.", *Shure, Inc.* v. *ClearOne, Inc.*, 21-1024 (Fed. Cir. 2020), Document No. 32, Mar. 10, 2021, 87.
Fed Cir Appeal 21-1024 Doc No. 36, "Plaintiff-Appellant's Reply Brief", *Shure, Inc.* v. *ClearOne, Inc.*, 21-1024 (Fed. Cir. 2020), Document No. 36, Apr. 12, 2021, 45.
Fed Cir Appeal 21-1024 Doc No. 43-1, "Joint Appendix vol. I", *Shure, Inc.* v. *ClearOne, Inc*, 21-1024 (Fed. Cir. 2020), Document No. 43-1, Apr. 23, 2021, 437.
Fed Cir Appeal 21-1024 Doc No. 43-2-43-4, "Joint Appendix vol. II", *Shure, Inc.* v. *ClearOne, Inc.*, 21-1024 (Fed. Cir. 2020), Document No. 43-2-43-4, Apr. 23, 2021, 467.
Fed Cir Appeal 21-1024 Doc No. 62, "ClearOne's Motion for Sanctions", *Shure, Inc.* v. *ClearOne, Inc.*, 21-1024 (Fed. Cir. 2020), Document No. 62, Jul. 16, 2021, 39.
Fed Cir Appeal 21-1024 Doc No. 63, "Opinion", *Shure, Inc.* v. *ClearOne, Inc.*, 21-1024 (Fed. Cir. 2020) (nonprecedential), Document No. 63, Jul. 20, 2021, 3.
Fed Cir Appeal 21-1024 Doc No. 67, "Plaintiff-Appellant's Reply Brief", *Shure, Inc.* v. *ClearOne, Inc.*, 21-1024 (Fed. Cir. 2020), Document No. 67, Aug. 3, 2021, 32.
Fed Cir Appeal 21-1024 Doc No. 68, "ClearOne's Reply in Support of Motion for Sanctions", *Shure, Inc.* v. *ClearOne, Inc.*, 21-1024 (Fed. Cir. 2020), Document No. 68, Aug. 10, 2021, 85.

(56) References Cited

OTHER PUBLICATIONS

Fed Cir Appeal 21-1024 Doc No. 69, "Order Denying Motion for Sanctions", *Shure, Inc.* v. *ClearOne, Inc.*, 21-1024 (Fed. Cir. 2020) (nonprecedential), Document No. 69, Aug. 24, 2021, 2.

Invensense Inc., "Microphone Array Beamforming", Dec. 31, 2013, 1-12.

IPR2019-00683 Ex 1003, "Declaration of Durand R. Begault, Ph.D., In Support of Petition for Inter Partes Review of U.S. Pat. No. 9,565,493", *ClearOne, Inc.* v *Shure Acquisition Holdings, Inc.*, IPR2019-00683 (PTAB), Exhibit No. 1003, Feb. 15, 2019, 139.

IPR2019-00683 Ex 1043, "Supplemental Declaration of Durand R. Begault, Ph.D.", *ClearOne, Inc.* v *Shure Acquisition Holdings, Inc.*, IPR2019-00683 (PTAB), Exhibit 1043, Jan. 31, 2020, 126.

IPR2019-00683 Ex 2029, "Supplemental Declaration of Dr Jeffrey S Vipperman", *ClearOne, Inc.* v *Shure Acquisition Holdings, Inc.*, IPR2019-00683 (PTAB), Exhibit 2029, Mar. 13, 2020, 55.

IPR2019-00683 Ex 2030-1, "File History of U.S. Appl. No. 15/218,297 Part 1 of 4", *ClearOne, Inc.* v *Shure Acquisition Holdings, Inc.*, IPR2019-00683 (PTAB), Exhibit 2030-1, Mar. 13, 2020, 254.

IPR2019-00683 Ex 2030-2, "File History of U.S. Appl. No. 15/218,297 Part 2 of 4", *ClearOne, Inc.* v *Shure Acquisition Holdings, Inc.*, IPR2019-00683 (PTAB), Exhibit 2030-2, Mar. 13, 2020, 263.

IPR2019-00683 Ex 2030-3, "File History of U.S. Appl. No. 15/218,297 Part 3 of 4", *ClearOne, Inc.* v *Shure Acquisition Holdings, Inc.*, IPR2019-00683 (PTAB), Exhibit 2030-3, Mar. 13, 2020, 250.

IPR2019-00683 Ex 2030-4, "File History of U.S. Appl. No. 15/218,297 Part 4 of 4", *ClearOne, Inc.* v *Shure Acquisition Holdings, Inc.*, IPR2019-00683 (PTAB), Exhibit 2030-4, Mar. 13, 2020, 241.

IPR2019-00683 Paper No. 01, "Petition for Inter Partes Review of U.S. Pat. No. 9,565,493", *ClearOne, Inc.* v *Shure Acquisition Holdings, Inc.*, IPR2019-00683 (PTAB), Paper No. 1, Feb. 15, 2019, 114.

IPR2019-00683 Paper No. 21, "Decision Granting Institution of Inter Partes Review", *ClearOne, Inc.* v *Shure Acquisition Holdings, Inc.*, IPR2019-00683 (PTAB), Paper No. 21, Aug. 16, 2019, 37.

IPR2019-00683 Paper No. 46, "Opposition to Motion to Amend", *ClearOne, Inc.* v *Shure Acquisition Holdings, Inc.*, IPR2019-00683 (PTAB), Paper No. 46, Jan. 31, 2021, 30.

IPR2019-00683 Paper No. 55, "Preliminary Guidance Patent Owner's Motion to Amend", *ClearOne, Inc.* v *Shure Acquisition Holdings, Inc.*, IPR2019-00683 (PTAB), Paper No. 55, Feb. 25, 2020, 18.

IPR2019-00683 Paper No. 57, "Patent Owners Revised Contingent Motion to Amend", *ClearOne, Inc.* v *Shure Acquisition Holdings, Inc.*, IPR2019-00683 (PTAB), Paper No. 57, Mar. 13, 2020, 42.

IPR2019-00683 Paper No. 58, "Patent Owner Sur Reply", *ClearOne, Inc.* v *Shure Acquisition Holdings, Inc.*, IPR2019-00683 (PTAB), Paper No. 58, Mar. 13, 2020, 32.

IPR2019-00683 Paper No. 68, "Opposition to Revised Motion to Amend", *ClearOne, Inc.* v *Shure Acquisition Holdings, Inc.*, IPR2019-00683 (PTAB), Paper No. 68, Apr. 23, 2020, 30.

IPR2019-00683 Paper No. 91, "Final Written Decision", *ClearOne, Inc.* v *Shure Acquisition Holdings, Inc.*, IPR2019-00683 (PTAB), Paper No. 91, dated Aug. 14, 2020, 118.

Johnson, D. H. et al., "Array Signal Processing. Concepts and Techniques," p. 59, Prentice Hall (1993), 3.

McCowan, I.A., "Microphone Arrays : A Tutorial" excerpt from "Robust Speech Recognition using Microphone Arrays," PhD Thesis, Queensland University of Technology, Australia (2001), 40.

PGR2020-00079 Doc No. 01, "Petition for Post Grant Review", *Shure, Inc.* v. *ClearOne, Inc.*, PGR2020-00079 (P.T.A. B.), Document No. 1, Jul. 28, 2020, 113.

PGR2020-00079 Doc No. 10, "Patent Owner Preliminary Response", *Shure, Inc.* v. *ClearOne, Inc.*, PGR2020-00079 (P.T.A.B.), Document No. 10, dated Nov. 17, 2020, 92.

PGR2020-00079 Doc No. 12, "Petitioner's Reply to Patent Owner's Preliminary Response", *Shure, Inc.* v. *ClearOne, Inc.*, PGR2020-00079 (P.T.A.B.), Document No. 12, dated Dec. 23, 2020, 12.

PGR2020-00079 Doc No. 13, "Patent Owner's Preliminary Surreply", *Shure, Inc.* v. *ClearOne, Inc.*, PGR2020-00079 (P.T.A.B.), Document No. 13, dated Jan. 6, 2021, 12.

PGR2020-00079 Doc No. 14, "Granting Institution of Post-Grant Review", *Shure, Inc.* v. *ClearOne, Inc.*, PGR2020-00079 (P.T.A.B.), Document No. 14, Feb. 16, 2021, 76.

PGR2020-00079 Doc No. 25, "Patent Owners Contingent Motion to Amend and Request for Preliminary Guidance", *Shure, Inc.* v. *ClearOne, Inc.*, PGR2020-00079 (P.T.A.B.), Document No. 25, May 11, 2021, 33.

PGR2020-00079 Doc No. 27, "Response", *Shure, Inc.* v. *ClearOne, Inc.*, PGR2020-00079 (P.T.A.B.), Document No. 27, dated May 11, 2021, 97.

PGR2020-00079 Doc No. 30, "Petitioners Reply to Patent Owner's Response", *Shure, Inc.* v. *ClearOne, Inc.*, PGR2020-00079 (P.T.A. B.), Document No. 30, dated Aug. 4, 2021, 34.

PGR2020-00079 Doc No. 31, "Petitioner's Opposition to Patent Owner's Contingent Motion to Amend and Request for Preliminary Guidance", *Shure, Inc.* v. *ClearOne, Inc.*, PGR2020-00079 (P.T.A. B.), Document No. 31, Aug. 4, 2021, 30.

PGR2020-00079 Doc No. 35, "Preliminary Guidance Patent Owner's Motion to Amend", *Shure, Inc.* v. *ClearOne, Inc.*, PGR2020-00079 (P.T.A.B.), Document No. 35, Aug. 27, 2021, 19.

PGR2020-00079 Doc No. 37, "Patent Owner's Revised Motion to Amend", *Shure, Inc.* v. *ClearOne, Inc.*, PGR2020-00079 (P.T.A.B.), Document No. 37, Sep. 14, 2021, 38.

PGR2020-00079 Doc No. 39, "Patent Owner's Surreply", *Shure, Inc.* v. *ClearOne, Inc.*, PGR2020-00079 (P.T.A.B.), Document No. 39, Sep. 14, 2021, 33.

PGR2020-00079 Doc No. 42, "Petitioners Opposition to Patent Owners Revised Contingent Motion to Amend", *Shure, Inc.* v. *ClearOne, Inc.*, PGR2020-00079 (P.T.A.B.), Document No. 42, Oct. 26, 2021, 29.

PGR2020-00079 Doc No. 49, "Reply to Petitioners Opposition to Patent Owners Revised Contingent Motion to Amend", *Shure, Inc.* v. *ClearOne, Inc.*, PGR2020-00079 (P.T.A.B.), Document No. 49, Nov. 16, 2021, 16.

PGR2020-00079 Doc No. 53, "Petitioner's Sur-Reply to Opposition to Revised Motion to Amend", *Shure, Inc.* v. *ClearOne, Inc.*, PGR2020-00079 (P.T.A.B.), Document No. 53, Dec. 7, 2021, 17.

PGR2020-00079 Doc No. 58, "Record of Oral Hearing", *Shure, Inc.* v. *ClearOne, Inc.*, PGR2020-00079 (P.T.A.B.), Document No. 58, Dec. 14, 2021, 82.

PGR2020-00079 Doc No. 59, "Final Written Decision", *Shure, Inc.* v. *ClearOne, Inc.*, PGR2020-00079 (P.T.A.B.), Document No. 59, dated Feb. 14, 2022, 77.

PGR2020-00079 Doc No. 60, "Petitioner's Notice of Appeal", *Shure, Inc.* v. *ClearOne, Inc.*, PGR2020-00079 (P.T.A. B.), Document No. 60, Feb. 24, 2022, 82.

PGR2020-00079 Exhibit 1002, "Declaration of Jeffrey S. Vipperman", *Shure, Inc.* v. *ClearOne, Inc.*, PGR2020-00079 (P.T.A.B.), Exhibit 1002, Jul. 28, 2020, 159.

PGR2020-00079 Exhibit 1014, "Meeting the Demand for Ceiling Mics in the Enterprise 5 Best Practices", *Shure, Inc.* v. *ClearOne, Inc.*, PGR2020-00079 (P.T.A.B.), Exhibit 1014, At least as early as 2012, 9.

PGR2020-00079 Exhibit 1015, "Frequently Asked Questions", *Shure, Inc.* v. *ClearOne, Inc.*, PGR2020-00079 (P.T. A.B.), Exhibit 1015, As early as 2009, 2.

PGR2020-00079 Exhibit 1023, "Specification Comparison Redline", *Shure, Inc.* v. *ClearOne, Inc.*PGR2020-00079 (P.T.A.B.), Exhibit 1023, Jul. 28, 2020, 52.

PGR2020-00079 Exhibit 1024, "Specification Comparison Redline", *Shure, Inc.* v. *ClearOne, Inc.*, PGR2020-00079 (P.T.A.B.), Exhibit 1024, Jul. 28, 2020, 52.

PGR2020-00079 Exhibit 1026, "Installation Manual and User Guidelines for the Soundman SM 02 System", *Shure, Inc.* v. *ClearOne, Inc.*, PGR2020-00079 (P.T.A.B.), Exhibit 1026, As early as 2001, 29.

PGR2020-00079 Exhibit 1027, "Introducing the CTG FS-400 and FS-800 with Beamforming Technology", *Shure, Inc.* v. *ClearOne, Inc.*, PGR2020-00079 (P.T.A.B.), Exhibit 1027, As early as 2008, 2.

PGR2020-00079 Exhibit 1036, "Diethorn, Eric J. "Chapter 4: Subband Noise Reduction Methods for Speech Enhancement." Audio Signal Processing for Next-Generation Multimedia Communication Systems, edited by Yiteng Huang and Jacob Benesty,

(56) References Cited

OTHER PUBLICATIONS

Kluwer Academic Publishers, 2004", *Shure, Inc.* v. *ClearOne, Inc.*, PGR2020-00079 (P.T.A.B.), Exhibit 1036, Aug. 3, 2021, 22.
PGR2020-00079 Exhibit 1036, "Second Declaration of Dr Jeffrey S Vipperman", *Shure, Inc.* v. *ClearOne, Inc.*, PGR2020-00079 (P.T. A.B.), Exhibit 1029, Aug. 3, 2021, 60.
PGR2020-00079 Exhibit 1037, "Warsitz, Ernst, and Haeb-Umbach, Reinhold. "Blind Acoustic Beamforming Based on Generalized Eigenvalue Decomposition." IEEE Transactions on Audio, Speech and Language Processing, vol. 15, No. 5, 2007, pp. 1529-1539", *Shure, Inc.* v. *ClearOne, Inc.*, PGR2020-00079 (P.T.A.B.), Exhibit 1037, Aug. 3, 2021, 11.
PGR2020-00079 Exhibit 1038, "Transcript of the deposition of Dr. Durand Begault, taken on Jul. 1, 2021", *Shure, Inc.* v. *ClearOne, Inc.*, PGR2020-00079 (P.T.A.B.), Exhibit 1038, Aug. 3, 2021, 262.
PGR2020-00079 Exhibit 1039, "Third Declaration of Dr Jeffrey S Vipperman", *Shure, Inc.* v. *ClearOne, Inc.*, PGR2020-00079 (P.T. A.B.), Exhibit 1039, Oct. 26, 2021, 46.
PGR2020-00079 Exhibit 1040, "Shure's Oral Argument Demonstratives", *Shure, Inc.* v. *ClearOne, Inc.*, PGR2020-00079 (P.T.A. B.), Exhibit 1040,Dec. 9, 2021, 115.
PGR2020-00079 Exhibit 2038, "Third Declaration of Durand Begault in Support of the Reply to the Opposition to the Revised Motion to Amend", *Shure, Inc.* v. *ClearOne, Inc.*, PGR2020-00079 (P.T.A.B.), Exhibit 2038, Nov. 16, 2021, 27.
PGR2020-00079 Exhibit 2039, "Second Deposition of Jeffery Vipperman", *Shure, Inc.* v. *ClearOne, Inc.*, PGR2020-00079 (P.T.A.B.), Exhibit 2039, Nov. 16, 2021, 37.
PGR2020-00079 Exhibit 2042, "Selected Definitions from McGraw Hill Telecom Dictionary", *Shure, Inc.* v. *ClearOne, Inc.*, PGR2020-00079 (P.T.A.B.), Exhibit 2042, Nov. 16, 2021, 4.
PGR2020-00079 Exhibit 2044, "DCT 1:17-cv-03078 Doc. No. 367", *Shure, Inc.* v. *ClearOne, Inc.*, PGR2020-00079 (P.T.A.B.), Exhibit 2044, Nov. 16, 2021, 15.
PGR2020-00079 Exhibit 2045, "DCT 1:17-cv-03078 Doc. No. 367-1 Selected Pages", *Shure, Inc.* v. *ClearOne, Inc.*, PGR2020-00079 (P.T.A.B.), Exhibit 2045, Nov. 16, 2021, 8.
PGR2020-00079 Exhibit 2049, "Toroidal Microphones by Sessler, West, and Schroeder", *Shure, Inc.* v. *ClearOne, Inc.*, PGR2020-00079 (P.T.A.B.), Exhibit 2049, Nov. 16, 2021, 10.
PGR2020-00079 Exhibit 2050, "DCT 1:17-cv-03078 Doc. No. 360", *Shure, Inc.* v. *ClearOne, Inc.*, PGR2020-00079 (P.T.A.B.), Exhibit 2050, Nov. 16, 2021, 6.
PGR2020-00079 Exhibit 2051, "Patent Owner's Demonstrative Exhibits", *Shure, Inc.* v. *ClearOne, Inc.*, PGR2020-00079 (P.T.A. B.), Exhibit 2051, Dec. 9, 2021, 76.
PGR2020-00079 Exhibit 2178, "Federal Circuit Appeal 21-1517 Doc 14", *Shure, Inc.* v. *ClearOne, Inc.*, PGR2020-00079 (P.T.A.B.), Exhibit 2178, Nov. 16, 2021, 99.
PGR2020-00079 Exhibit 2179, "Federal Circuit Appeal 21-1517 Doc 18", *Shure, Inc.* v. *ClearOne, Inc.*, PGR2020-00079 (P.T.A.B.), Exhibit 2179, Nov. 16, 2021, 84.
PGR2020-00079 Exhibit 2180, "Federal Circuit Appeal 21-1517 Doc 22", *Shure, Inc.* v. *ClearOne, Inc.*, PGR2020-00079 (P.T.A.B.), Exhibit 2180, Nov. 16, 2021, 53.
Sasaki, et al., "A Predefined Command Recognition System Using a Ceiling Microphone Array in Noisy Housing Environments", 2008 IEEE/RSJ International Conference on Intelligent Robots and Systems, Sep. 22-26, 2008, 7.
Soda, et al., "Introducing Multiple Microphone Arrays for Enhancing Smart Home Voice Control", The Institute of Electronics, Information and Communication Engineers, Technical Report of IEICE., Jan. 23-25, 2013, 7.
The Enright Company, "Scanlines (Jun. 2009)", *Shure, Inc.* v. *ClearOne, Inc.*, PGR2020-00079 (P.T.A.B.), Exhibit 1028, Jun. 2009, 9.
Amazon, "Pure Resonance Audio SD4 SuperDispersion Ceiling Speaker Array, Built-In 8 Ohm/70 V Transformer", 4 pages, Nov. 20, 2007.
Businesswire, "Lightspeed Technologies Unveils New In-Ceiling Classroom Audio Solutions at ISTE", 2 pages, Jun. 27, 2011.
Prosoundweb, "Extron Now Shipping New Two-Way SoundField, Full-Range Ceiling Tile Speaker", 2 pages, Jun. 8, 2011.
Youtube, "Pure Resonance Audio SD4 SuperDispersion Ceiling Speaker Array, Built-In 8 Ohm/70 V Transformer", 1 page, Mar. 19, 2012.

* cited by examiner

CEILING TILE MICROPHONE

CROSS REFERENCE TO RELATED APPLICATIONS

This application claims priority and the benefits of the earlier filed Provisional USAN 61771751, filed Mar. 1, 2013, which is incorporated by reference for all purposes into this specification.

This application claims priority and the benefits of the earlier filed Provisional USAN 61828524, filed May 29, 2013, which is incorporated by reference for all purposes into this specification.

Additionally, this application is a continuation of USAN 14191511, filed Feb. 27 2014, which is incorporated by reference for all purposes into this specification.

Additionally, this application is a continuation of USAN 14276438, filed May 13 2014, which is incorporated by reference for all purposes into this specification.

Additionally, this application is a continuation of USAN 14475849, filed Sep. 3 2014, which is incorporated by reference for all purposes into this specification.

Additionally, this application is a continuation of USAN 15218297, filed Jul. 25 2016, which is incorporated by reference for all purposes into this specification.

Additionally, this application is a continuation of USAN 16872557, filed May 12 2020, which is incorporated by reference for all purposes into this specification.

TECHNICAL FIELD

This disclosure relates to beamforming microphone arrays. More specifically, this invention disclosure relates to a ceiling tile microphone that includes a beamforming microphone array system.

BACKGROUND ART

A traditional beamforming microphone array is configured for use with a professionally installed application, such as video conferencing in a conference room. Such microphone array typically has an electro-mechanical design that requires the array to be installed or set-up as a separate device with its own mounting system in addition to other elements (e.g., lighting fixtures, decorative items and motifs, etc.) in the room. For example, a ceiling-mounted beamforming microphone array may be installed as a separate component with a suspended or "drop" ceiling using suspended ceiling tiles in the conference room. In another example, the ceiling-mounted beamforming microphone array may be installed in addition to a lighting fixture in a conference room.

Individual microphone elements designed for far field audio use can be characterized, in part, by their pickup pattern. The pickup pattern describes the ability of a microphone to reject noise and indirect reflected sound arriving at the microphone from undesired directions. Microphone element pickup patterns can be omni-directional, cardioid, or other patterns that include supercardiodid, hypercardioid, cosine, custom, or bidirectional.

In a beamforming microphone array designed for far field use, a designer chooses the spacing between microphones to enable spatial sampling of a traveling acoustic wave and the spacing also affects the beamformer pickup pattern. Signals from the array of microphones are combined using various algorithms or element weighting values to form a desired pickup pattern. If enough microphones are used in the array, the pickup pattern may yield improved attenuation of undesired signals that propagate from directions other than the "direction of look" of a particular beam formed by the array.

For use cases in which a beamformer is used for room audio conferencing, audio streaming, audio recording, and audio used with video conferencing products, it is desirable for the beamforming microphone array to capture audio containing frequencies that span the full range of human hearing. This is generally accepted to be 20 Hz to 20 kHz.

Some beamforming microphone arrays are designed for "close talking" applications, like a mobile phone handset. In these applications, the microphone elements in the beamforming array are positioned within a few centimeters, to less than one meter, from the talker's mouth during active use. The main design objective of close talking microphone arrays is to maximize the quality of the speech signal picked up from the direction of the talker's mouth while attenuating sounds arriving from all other directions. Close talking microphone arrays are generally designed so that their pickup pattern is optimized for a single fixed direction.

Problems with the Prior Art

The traditional approach for installing a ceiling-mounted that hangs from the ceiling, a wall-mounted, or a table mounted beamforming microphone array results in the array being visible to people in the conference room. Once such approach is disclosed in U.S. Pat. No. 8,229,134 discussing a beamforming microphone array and a camera. However, it is not practical for a video or teleconference conference room since the color scheme, size, and geometric shape of the array might not blend well with the décor of the conference room. Also, the cost of installation of the array involves an additional cost of a ceiling-mount or a wall-mount system for the array.

It is well known by those of ordinary skill in the art that the closest spacing between microphones restricts the highest frequency that can be resolved by the array and the largest spacing between microphones restricts the lowest frequency that can be resolved. At a given temperature and pressure in air, the relationship between the speed of sound, its frequency, and its wavelength is $c=\lambda v$ where c is the speed of sound, A is the wavelength of the sound, and v is the frequency of the sound.

For professionally installed conferencing applications, it is desirable for a microphone array to have the ability to capture and transmit audio throughout the full range of human hearing that is generally accepted to be 20 Hz to 20 kHz. The low frequency design requirement presents problems due to the physical relationship between the frequency of sound and its wavelength given by the simple equation in the previous paragraph. For example, at 20 degrees Celsius (68 degrees Fahrenheit) at sea level, the speed of sound in dry air is 343 meters per second. In order to perform beamforming down to 20 Hz, the elements of a beamforming microphone array would need to be 343/(2*20)=8.58 meters (28 feet) apart. A beamforming microphone array this long would be difficult to manufacture, transport, install, and service. It would also not be practical in most conference rooms used in normal day-to-day business meetings in corporations around the globe.

The high frequency requirement for professional installed applications also presents a problem. Performing beamforming for full bandwidth audio may require significant computing resources including memory and CPU cycles, translating directly into greater cost.

It is also generally known to those of ordinary skill in the art that in most conference rooms, low frequency sound reverberates more than high frequency sound. One well-known acoustic property of a room is the time it takes the power of a sound impulse to be attenuated by 60 Decibels (dB) due to absorption of the sound pressure wave by materials and objects in the room. This property is called RT60 and is measured as an average across all frequencies. Rather than measuring the time it takes an impulsive sound to be attenuated, the attenuation time at individual frequencies can be measured. When this is done, it is observed that in most conference rooms, lower frequencies, (up to around 4 kHz) require a longer time to be attenuated by 60 dB as compared to higher frequencies (between around 4 kHz and 20 kHz).

Solution to Problem

Embodiments of this disclosure are in the form of a ceiling tile (with or without sound absorbing material), light fixtures, or wall panels (with or without sound absorbing materials), and acoustic wall panels.

Additionally, embodiments of this disclosure include coupling one or more non-beamforming microphones with a beamforming microphone array to provide augmented beamforming.

Advantageous Effects of Invention

The commercial advantages of various embodiments of this disclosure are: smaller physical size and lower cost compared to a design based on prior art that performs beamforming through the entire range of human hearing; and the simplicity of installation such as the ceiling tile microphone embodiment.

Additionally, the commercial advantages of the various embodiments of this disclosure enables the full range of human hearing to be captured and transmitted by the combined set of BFMs 502 and NBMs 504 while minimizing the physical size of the band-limited array 116, and simultaneously allowing the cost to be reduced as compared to existing beamforming array designs and approaches that perform beamforming throughout the entire frequency range of human hearing.

SUMMARY OF INVENTION

This disclosure describes an apparatus and method of an embodiment of an invention that is a ceiling tile microphone. This embodiment of the apparatus/system includes: a plurality of microphones coupled together as a microphone array used for beamforming, the plurality of microphones are positioned at predetermined locations and produce audio signals to be used to form a directional pickup pattern; a single ceiling tile with an outer surface on the front side of the ceiling tile where the outer surface is acoustically transparent, the microphone array couples to the back side of the single ceiling tile, the microphone array combines with the ceiling tile as a single unit, the single unit is mountable in a drop ceiling in place of a single ceiling tile included in the drop ceiling, all or part of the single unit is in the drop space of the drop ceiling when the single unit is used in a drop ceiling mounting configuration; where the ceiling tile microphone further includes beamforming, acoustic echo cancellation, and auto mixing.

The above embodiment of the invention may include one or more of these additional embodiments that may be combined in all combinations with the above embodiment. One embodiment of the invention that further includes auto voice tracking. One embodiment of the invention that further includes Power over Ethernet. One embodiment of the invention that further includes a configurable pickup pattern for the beamforming. One embodiment of the invention describes where auto mixing includes one or more of the following parameters: number of open microphones (NOM), first mic priority mode, last mic mode, maximum number of mics mode, ambient level, gate threshold adjust, off attenuation, adjust hold time, and decay rate. One embodiment of the invention that further includes adjustable noise cancellation. One embodiment of the invention that further includes one or more additional non-beamforming microphone(s) configured to resolve audio input signals from the non-beamforming microphone(s). One embodiment of the invention describes where all of the plurality microphones of the microphone array are disposed behind the outer surface of the single ceiling tile and in a common housing. One embodiment of the invention that further includes an ethernet connector on the exterior of the common housing and is configured to receive power for the microphone array through the ethernet connector. One embodiment of the invention describes where adaptive acoustic processing automatically adjusts a beamforming operation of the microphone array to a room configuration and is configured to create an audio beam over a predetermined frequency range based on the predetermined locations. One embodiment of the invention that further includes a USB port.

The present disclosure further describes an apparatus and method of an embodiment of the invention as further described in this disclosure. Other and further aspects and features of the disclosure will be evident from reading the following detailed description of the embodiments, which should illustrate, not limit, the present disclosure.

BRIEF DESCRIPTION OF DRAWINGS

The drawings accompanying and forming part of this specification are included to depict certain aspects of the disclosure. A clearer impression of the disclosure, and of the components and operation of systems provided with the disclosure, will become more readily apparent by referring to the exemplary, and therefore non-limiting, embodiments illustrated in the drawings, where identical reference numerals designate the same components. Note that the features illustrated in the drawings are not necessarily drawn to scale. The following is a brief description of the accompanying drawings.

DESCRIPTION OF EMBODIMENTS

Figure 1A:
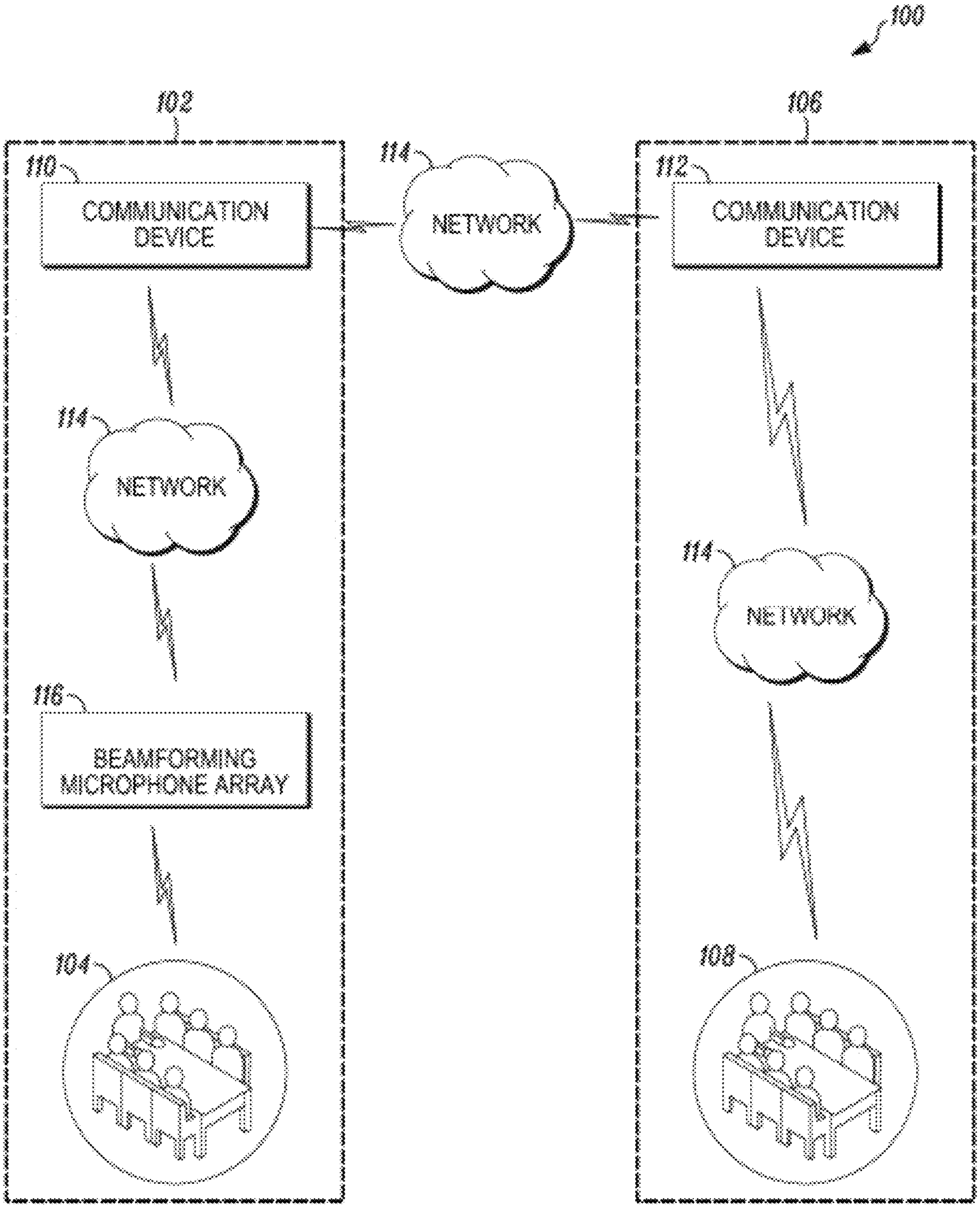
FIGS. 1A and 1B are schematics that illustrate environments according to one or more embodiment(s) of the present disclosure.

The disclosed embodiments should describe aspects of the disclosure in sufficient detail to enable a person of ordinary skill in the art to practice the invention. Other embodiments may be utilized, and changes may be made without departing from the disclosure. The following detailed description is not to be taken in a limiting sense, and the present invention is defined only by the included claims.

Specific implementations shown and described are only examples and should not be construed as the only way to implement or partition the present disclosure into functional elements unless specified otherwise in this disclosure. A person of ordinary skill in the art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

In the following description, elements, circuits, functions, and devices may be shown in block diagram form in order not to obscure the present disclosure in unnecessary detail. And block definitions and partitioning of logic between various blocks are exemplary of a specific implementation. It will be readily apparent to a person of ordinary skill in the art that the present disclosure may be practiced by numerous other partitioning solutions. A person of ordinary skill in the art would understand that information and signals may be represented using any of a variety of technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, where the bus may have a variety of bit widths and the present disclosure may be implemented on any number of data signals including a single data signal.

The illustrative functional units include logical blocks, functions, modules, circuits, and devices described in the embodiments disclosed in this disclosure to emphasize their implementation independence more particularly. The functional units may be implemented or performed with a general-purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described in this disclosure. A general-purpose processor may be a microprocessor, any conventional processor, controller, microcontroller, or state machine. A general-purpose processor may be considered a special purpose processor while the general-purpose processor is configured to fetch and execute instructions (e.g., software code) stored on a computer-readable medium such as any type of memory, storage, and/or storage devices. A processor may also be implemented as a combination of computing devices, such as a combination of a DSP and a microprocessor, a plurality of microprocessors, one or more microprocessors in conjunction with a DSP core, or any other such configuration.

In addition, the illustrative functional units described above may include software, programs, or algorithms such as computer readable instructions that may be described in terms of a process that may be depicted as a flowchart, a flow diagram, a structure diagram, or a block diagram. The process may describe operational acts as a sequential process, many acts can be performed in another sequence, in parallel, or substantially concurrently. Further, the order of the acts may be rearranged. In addition, the software may comprise one or more objects, agents, threads, lines of code, subroutines, separate software applications, two or more lines of code or other suitable software structures operating in one or more software applications or on one or more processors. The software may be distributed over several code segments, modules, among different programs, and across several memory devices. Similarly, operational data may be identified and illustrated in this disclosure within modules and may be embodied in any suitable form and organized within any suitable data structure. The operational data may be collected as a single data set or may be distributed over different locations including over different storage devices. Data stated in ranges include each and every value within that range.

Elements described in this disclosure may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most discussed. For example, where feasible elements in Drawing 1 are designated with a format of 1*xx*, where 1 indicates Drawing 1 and xx designates the unique element.

Any reference to an element in this disclosure using a designation such as "first," "second," and so forth does not limit the quantity or order of those elements, unless such limitation is explicitly stated. Rather, these designations may be used in this disclosure as a convenient method of distinguishing between two or more elements or instances of an element. A reference to a first and second element does not mean that only two elements may be employed or that the first element must precede the second element. In addition, unless stated otherwise, a set of elements may comprise one or more elements.

Reference throughout this specification to "one embodiment", "an embodiment" or similar language means that a particular feature, structure, or characteristic described in the embodiment is included in at least one embodiment of the present invention. Appearances of the phrases "one embodiment", "an embodiment" and similar language throughout this specification may, but do not necessarily, all refer to the same embodiment.

In the following detailed description, reference is made to the illustrations, which form a part of the present disclosure, and in which is shown, by way of illustration, specific embodiments in which the present disclosure may be practiced. These embodiments are described in sufficient detail to enable a person of ordinary skill in the art to practice the present disclosure. However, other embodiments may be utilized, and structural, logical, and electrical changes may be made without departing from the true scope of the present disclosure. The illustrations in this disclosure are not meant to be actual views of any particular device or system but are merely idealized representations employed to describe embodiments of the present disclosure. And the illustrations presented are not necessarily drawn to scale. And, elements common between drawings may retain the same or have similar numerical designations.

It will also be appreciated that one or more of the elements depicted in the drawings can also be implemented in a more separated or integrated manner, or even removed or rendered as inoperable in certain cases, as is useful in accordance with a particular application. Additionally, any signal arrows in the drawings should be considered only as exemplary, and not limiting, unless otherwise specifically noted. The scope of the present disclosure should be determined by the following claims and their legal equivalents.

As used in this disclosure, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Furthermore, the term "or" as used in this disclosure is generally intended to mean "and/or" unless otherwise indicated. For example, a condition A or B is satisfied by any one of the following: A is true (or present) and B is false (or not present); A is false (or not present) and B is true (or present); and both A and B are true (or present). As used in this disclosure, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description in this disclosure, the meaning of "in" includes "in" and "on" unless the context clearly dictates otherwise.

The claims following this written disclosure are expressly incorporated into the present written disclosure, with each claim standing on its own as a separate embodiment. This disclosure includes all permutations of the independent claims with their dependent claims. Further, additional embodiments capable of derivation from the independent and dependent claims that follow are also expressly incorporated into the present written description.

To aid any Patent Office and any readers of any patent issued on this disclosure in interpreting the included claims, the Applicant(s) wish to note that they do not intend any of the appended claims or claim elements to invoke 35 U.S.C. 112(f) (previously U.S.C. 112(6)) unless the words "means for" or "step for" are explicitly used in that claim. Additionally, if any elements are specifically recited in means-plus-function format, then those elements are intended to be construed to cover the corresponding structure, material, or acts described in this disclosure or additional equivalents in accordance with 35 U.S.C. 112(f) (previously 35 U.S.C. 112(6)).

Non-limiting Definitions

In various embodiments of the present disclosure, definitions of one or more terms that will be used in the document are provided below.

A "beamforming microphone" is used in the present disclosure in the context of its broadest definition. The beamforming microphone may refer to a plurality of omni-directional microphones coupled together that are used with a digital signal processing algorithm to form a directional pickup pattern that could be different from the directional pickup pattern of any individual omnidirectional microphone in the array.

A "non-beamforming microphone" is used in the present disclosure in the context of its broadest definition. The non-beamforming microphone may refer to a microphone configured to pick up audio input signals over a broad frequency range received from multiple directions. Examples of non-beamforming microphones can include standard cardioid microphones such as typically found in conference rooms. A non-beamforming microphone is a microphone that produces an output that is not used by the beamforming algorithm to produce a directional pickup pattern.

The numerous references in the disclosure to a beamforming microphone array are intended to cover any and/or all devices capable of performing respective operations in the applicable context, regardless of whether or not the same are specifically provided.

Figure 1B:
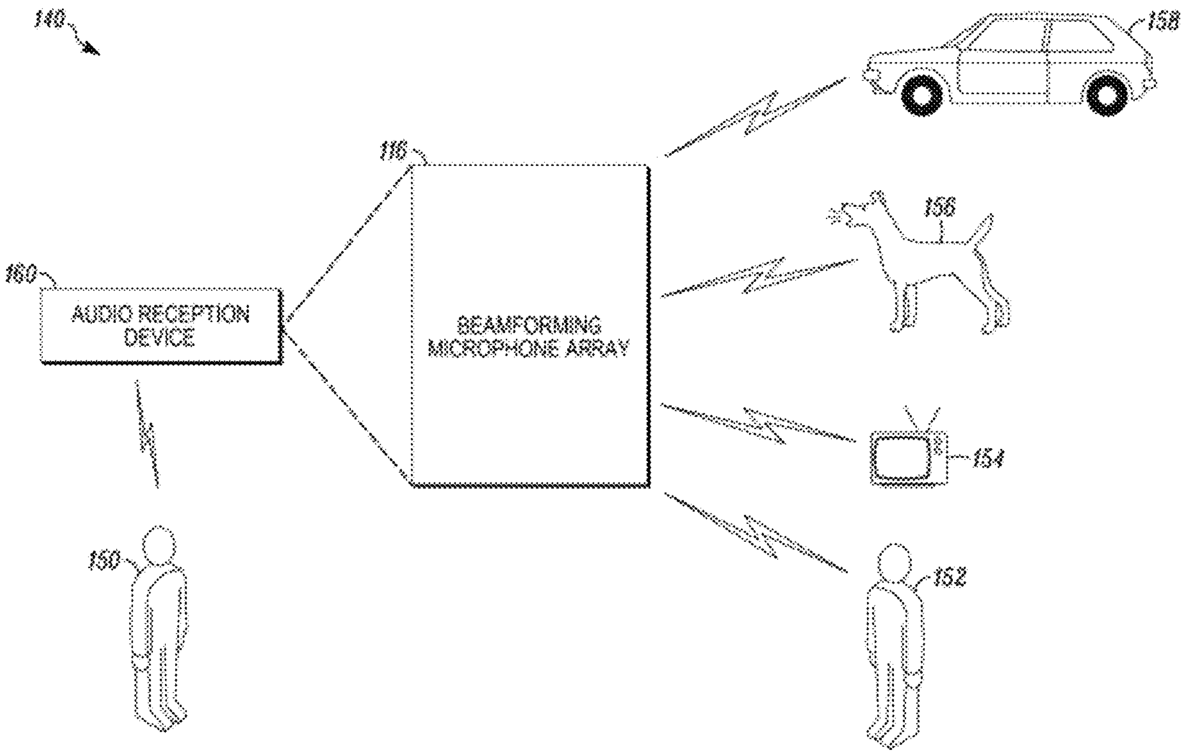

FIGS. 1A and 1B are schematics that illustrate environments for implementing an exemplary beamforming microphone array, according to some exemplary embodiments of the present disclosure. Additionally, these figures illustrate environments for a band-limited beamforming microphone array by augmenting a beamforming microphone array with non-beamforming microphones. The embodiment shown in FIG. 1A illustrates a first environment 100 (e.g., audio conferencing, video conferencing, etc.) that involves interaction between multiple users located within one or more substantially enclosed areas, e.g., a room. The first environment 100 may include a first location 102 having a first set of users 104 and a second location 106 having a second set of users 108. The first set of users 104 may communicate with the second set of users 108 using a first communication device 110 and a second communication device 112 respectively over a network 114. The first communication device 110 and the second communication device 112 may be implemented as any of a variety of computing devices (e.g., a server, a desktop PC, a notebook, a workstation, a personal digital assistant (PDA), a mainframe computer, a mobile computing device, an internet appliance, etc.) and calling devices (e.g., a telephone, an internet phone, etc.). The first communication device 110 may be compatible with the second communication device 112 to exchange audio, video, or data input signals with each other or any other compatible devices.

The disclosed embodiments may involve transfer of data, e.g., audio data, over the network 114. The network 114 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network 114 may include multiple networks or sub-networks, each of which may include, for example, a wired or wireless data pathway. The network 114 may include a circuit-switched voice network, a packet-switched data network, or any other network able to carry electronic communications. For example, the network 114 may include networks based on the Internet protocol (IP) or asynchronous transfer mode (ATM), and may support voice using, for example, VoIP, Voice-over-ATM, or other comparable protocols used for voice data communications. Other embodiments may involve the network 114 including a cellular telephone network configured to enable exchange of text or multimedia messages.

The first environment 100 may also include an embodiment that includes a beamforming microphone array 116 interfacing between the first set of users 104 and the first communication device 110 over the network 114. Another embodiment provides that the beamforming microphone array is band-limited. All embodiments are hereinafter referred to as Array 116. The Array 116 may include multiple microphones for converting ambient sounds (such as voices or other sounds) from various sound sources (such as the first set of users 104) at the first location 102 into audio input signals. In an embodiment, the Array 116 may include a combination of beamforming microphones as previously defined (BFMs) and non-beamforming microphones (NBFMs). The BFMs may be configured to capture the audio input signals (BFM signals) within a first frequency range, and the NBMs (NBM signals) may be configured to capture the audio input signals within a second frequency range.

The main beamformer output signal has a bandpass frequency response. Listeners may complain that it lacks low-end and high-end frequency response. One non-beamforming microphone may be added to help supplement the low-end response of the beamformer. Another non-beamforming microphone may be added to supplement the high-end response. Some sort of noise reduction processing may need to be included to maintain a high signal to noise ratio after the non-beamforming microphones are added.

The band-limited array 116 may transmit the captured audio input signals to the first communication device 110 for processing and transmit the processed captured audio input signals to the second communication device 112. In an embodiment, the first communication device 110 may be configured to perform augmented beamforming within an intended bandpass frequency window using a combination of BFMs and one or more NBMs. For this, the first communication device 110 may be configured to combine band-limited NBM signals to the BFM signals within the bandpass frequency window, discussed later in greater detail, by applying one or more of various beamforming algorithms, such as, the delay and sum algorithm, the filter and sum algorithm, etc. or other beamforming algorithms known in the art, related art or developed later. The bandpass frequency window may be a combination of the first frequency range corresponding to the BFMs and the band-limited second frequency range corresponding to the NBMs.

Another embodiment of Array 116 may include Acoustic Echo Cancellation (AEC). One skilled in the art will understand that the AEC processing may occur in the same first device that includes the beamforming microphones, or it may occur in a separate device, such as a special AEC processing device, a general processing device, or even in the communications device, that is in communication with the first device. In addition, another embodiment of Array 116 includes beamforming and adaptive steering technology. Further, another embodiment of Array 116 may include adaptive acoustic processing that automatically adjusts to the room configuration for the best possible audio pickup. Additionally, another embodiment of Array 116 may include a configurable pickup pattern for the beamforming. Further, another embodiment of Array 116 may provide beamforming that includes adjustable noise cancellation. In addition, another embodiment of Array 116 may include a microphone array that includes 24 microphone elements. Additionally, another embodiment of Array 116 may include the features and/or functionality of a digital signal processing (DSP) auto mixer such as a ClearOne CONVERGE Pro product or other audio/conferencing mixers with comparable features.

Embodiments of the Array 116 can further include audio acoustic characteristics that include: auto voice tracking, adjustable noise cancellation, mono and stereo, replaces traditional microphones with expanded pick-up range. Embodiments of the Array 116 can include auto mixer parameters that include: Number of Open Microphones (NOM), First mic priority mode, Last mic mode, Maximum number of mics mode, Ambient level, Gate threshold adjust, Off attenuation, adjust Hold time, and Decay rate. Embodiments of the Array 116 can include beamforming microphone array configurations that include: Echo cancellation on/off, Noise cancellation on/off, Filters: (All Pass, Low Pass, High Pass, Notch, PEQ), ALC on/off, Gain adjust, Mute on/off, Auto gate/manual gate.

The Array 116 may transmit the captured audio input signals to the first communication device 110 for processing and transmitting the processed, captured audio input signals to the second communication device 112. In one embodiment, the first communication device 110 may be configured to perform augmented beamforming within an intended bandpass frequency window using a combination of the BFMs and one or more NBFMs. For this, the first communication device 110 may be configured to combine NBFM signals to the BFM signals to generate an audio signal that is sent to communication device 110, discussed later in greater detail, by applying one or more of various beamforming algorithms to the signals captured from the BFMs, such as, the delay and sum algorithm, the filter and sum algorithm, etc. known in the art, related art or developed later and then combining that beamformed signal with the non-beamformed signals from the NBFMs. The frequency range processed by the beamforming microphone array may be a combination of a first frequency range corresponding to the BFMs and a second frequency range corresponding to the NBFMs, discussed below. In another embodiment, the functionality of the communication device 110 may be incorporated into Array 116.

The Array 116 may be designed to perform better than a conventional beamforming microphone array by augmenting the beamforming microphones with non-beamforming microphones that may have built-in directionality, or that may have additional noise reduction processing to reduce the amount of ambient room noise captured by the Array. In one embodiment, the first communication device 110 may configure the desired frequency range to the human hearing frequency range (i.e., 20 Hz to 20 KHz); however, one of ordinary skill in the art may predefine the frequency range based on an intended application. In some embodiments, the Array 116 in association with the first communication device 110 may be additionally configured with adaptive steering technology known in the art, related art, or developed later for better signal gain in a specific direction towards an intended sound source, e.g., at least one of the first set of users 104.

The first communication device 110 may transmit one or more augmented beamforming signals within the frequency range to the second set of users 108 at the second location 106 via the second communication device 112 over the network 114. In some embodiments, the Array 116 may be integrated with the first communication device 110 to form a communication system. Such system or the first communication device 110, which is configured to perform beamforming, may be implemented in hardware or a suitable combination of hardware and software, and may include one or more software systems operating on a digital signal processing platform. The "hardware" may include a combination of discrete components, an integrated circuit, an application-specific integrated circuit, a field programmable gate array, a digital signal processor, or other suitable hardware. The "software" may include one or more objects, agents, threads, lines of code, subroutines, separate software applications, two or more lines of code or other suitable software structures operating in one or more software applications or on one or more processors.

As shown in FIG. 1B, a second exemplary environment 140 (e.g., public surveillance, song recording, etc.) may involve interaction between a user and multiple entities located at open surroundings, like a playground. The second environment 140 may include a user 150 receiving sounds from various sound sources, such as, a second person 152 or a group of persons, a television 154, an animal such as a dog 156, transportation vehicles such as a car 158, etc., present in the open surroundings via an audio reception device 160. The audio reception device 160 may be in communication with, or include, the Array 116 configured to perform beamforming on audio input signals based on the sounds received or picked up from various entities behaving as sound sources, such as those mentioned above, within the predefined bandpass frequency window. The audio reception device 160 may be a wearable device which may include, but is not limited to, a hearing aid, a hand-held baton, a body clothing, eyeglass frames, etc., which may be generating the augmented beamforming signals within the frequency range, such as the human hearing frequency range.

Figure 2A:
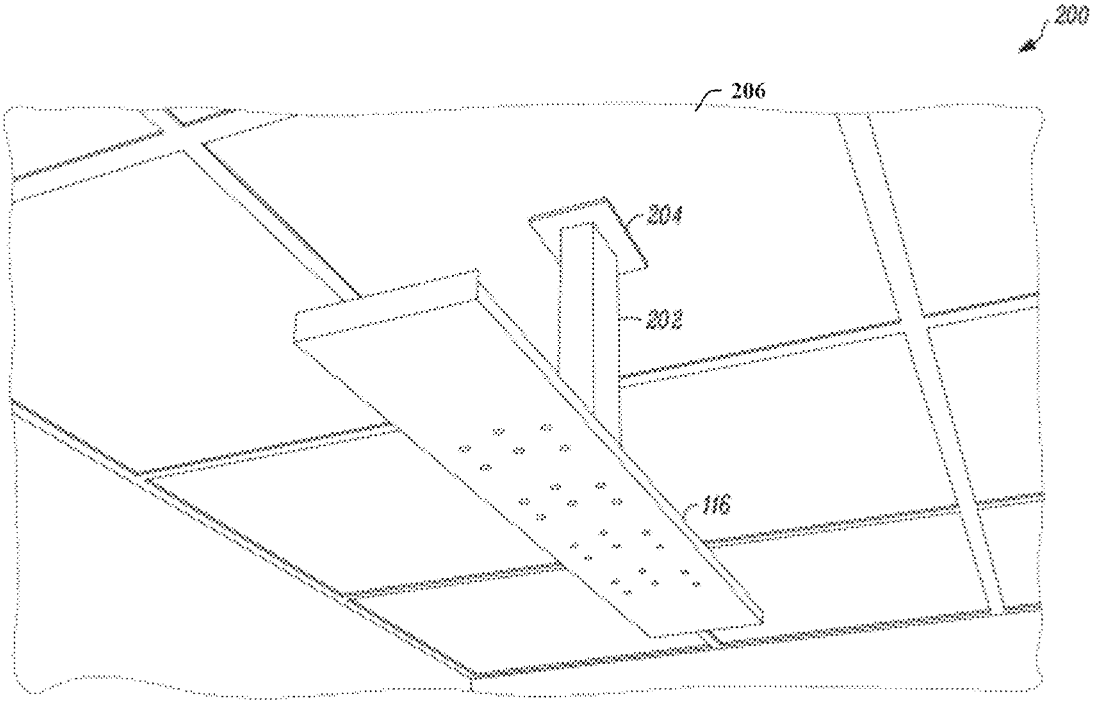
FIG. 2A to 2J illustrate usage configurations according to one or more embodiment(s) of the present disclosure.
Figure 2B:
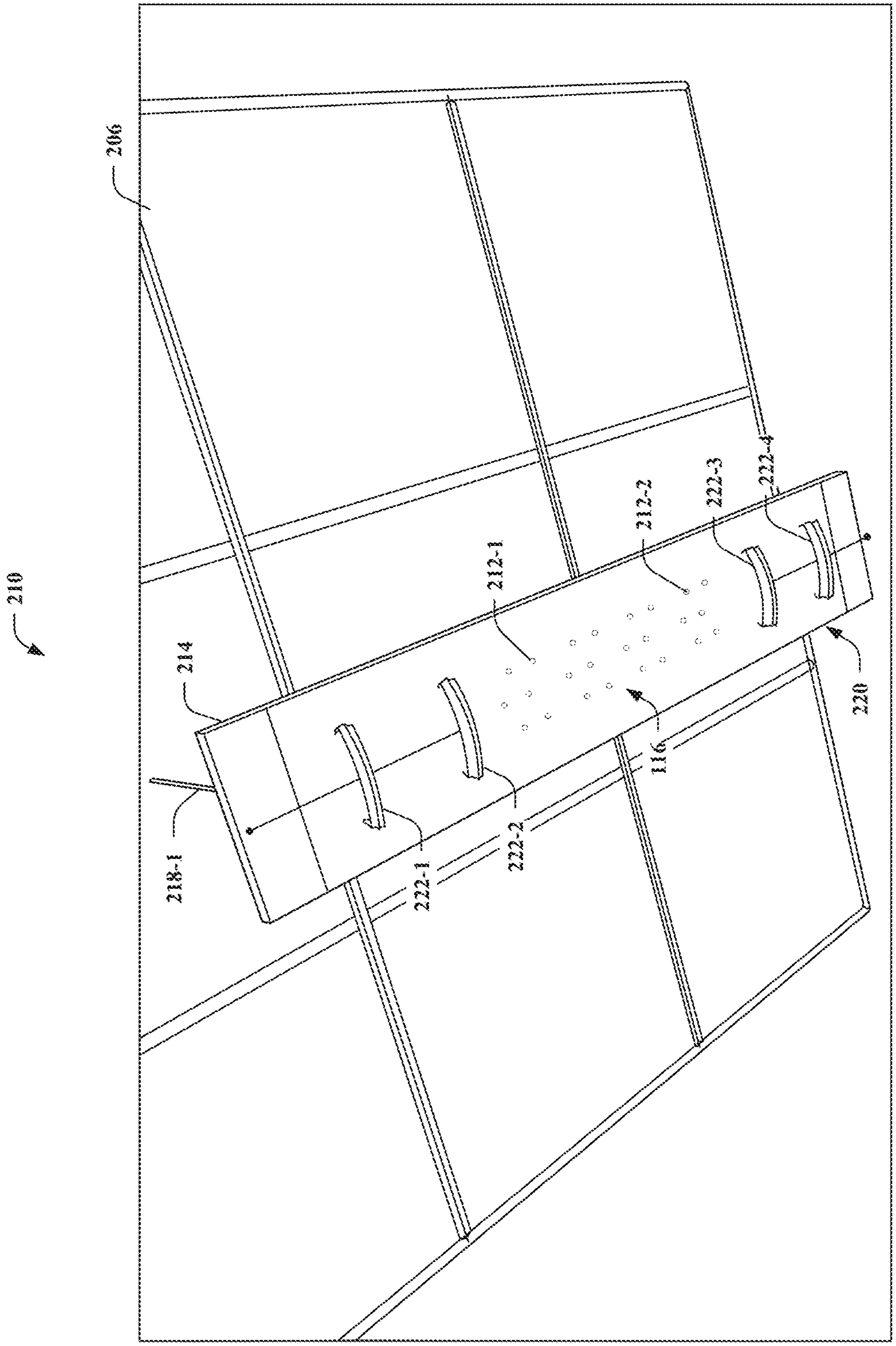
Figure 2C:
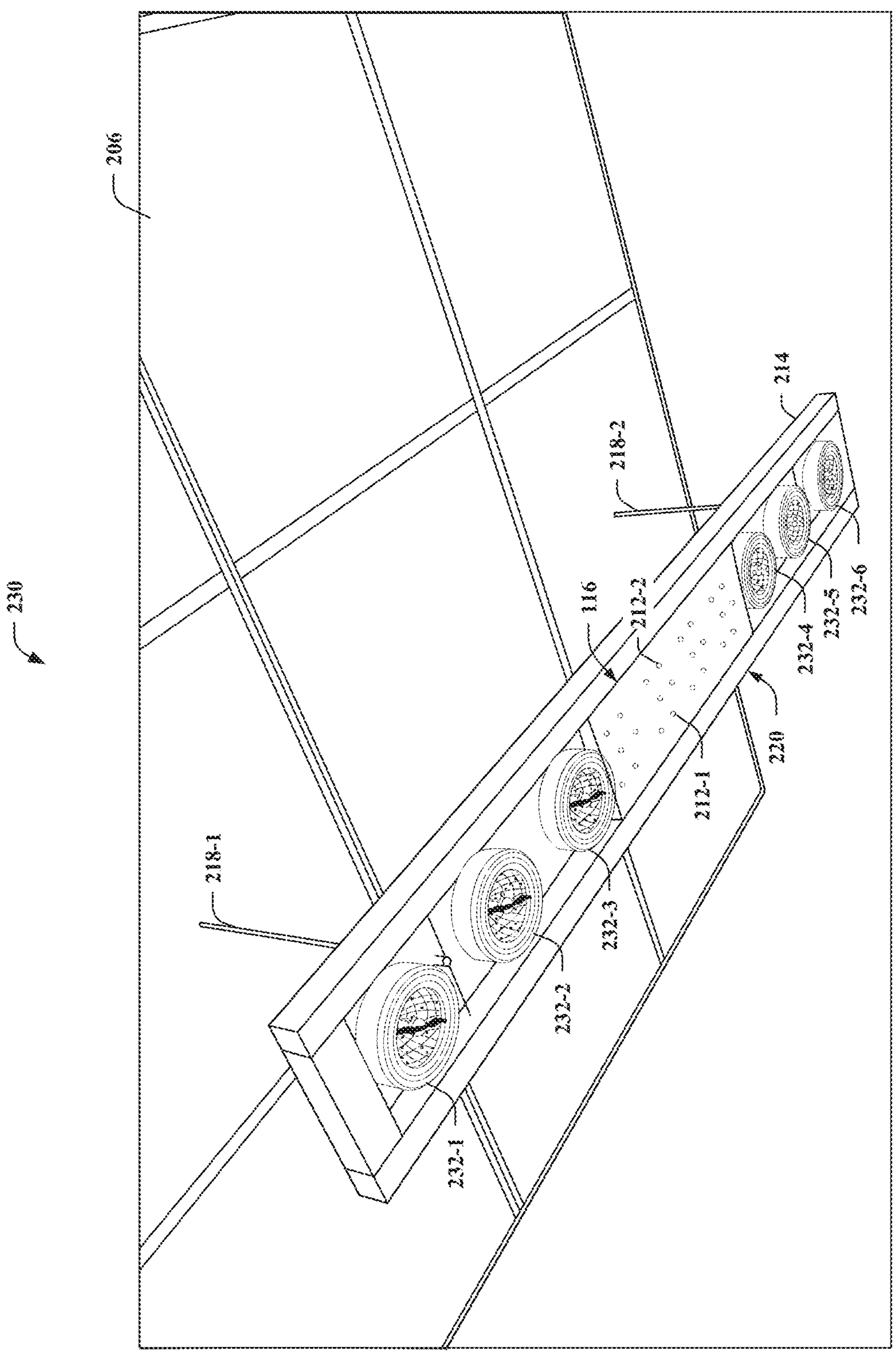
Figure 2D:
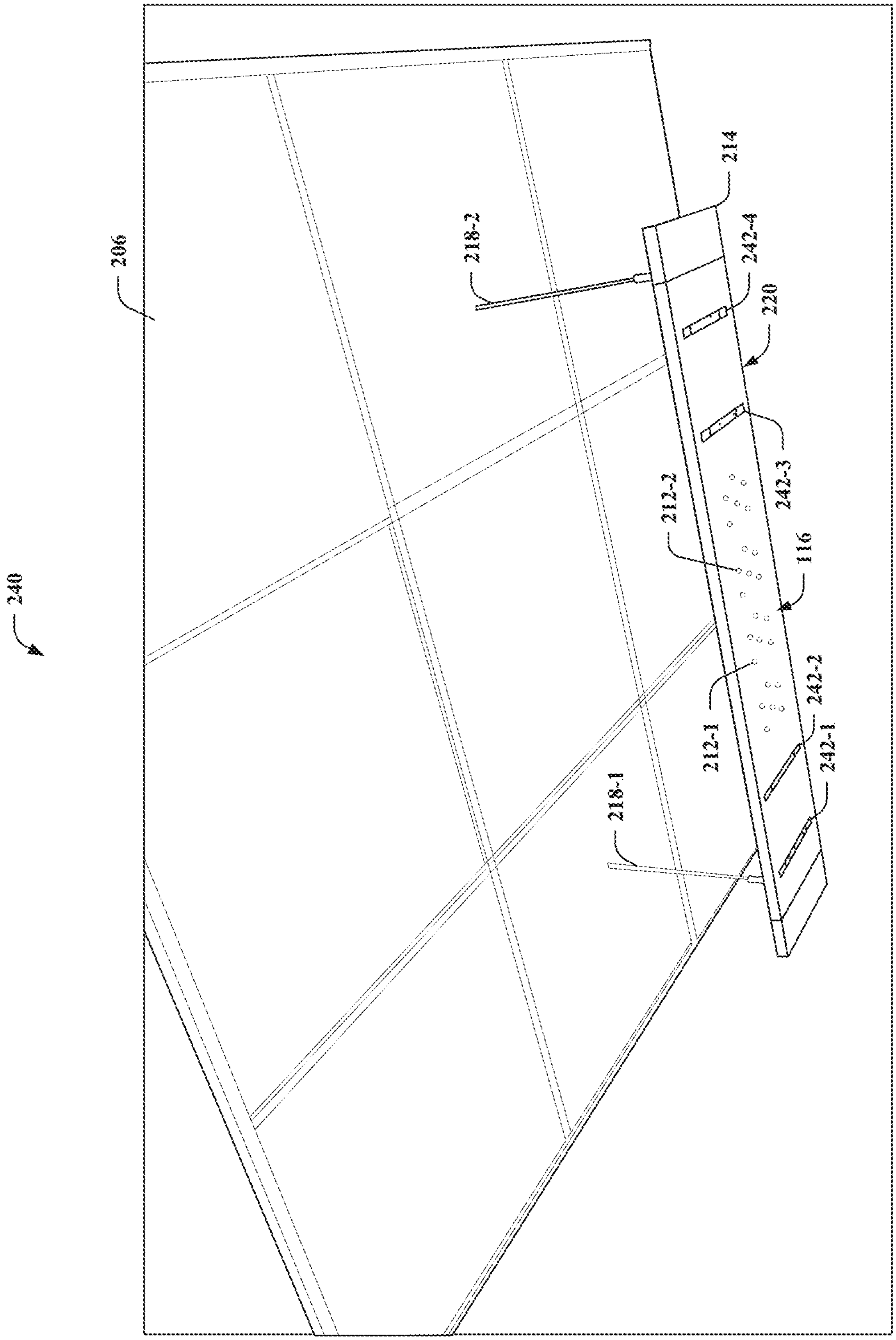
Figure 2E:
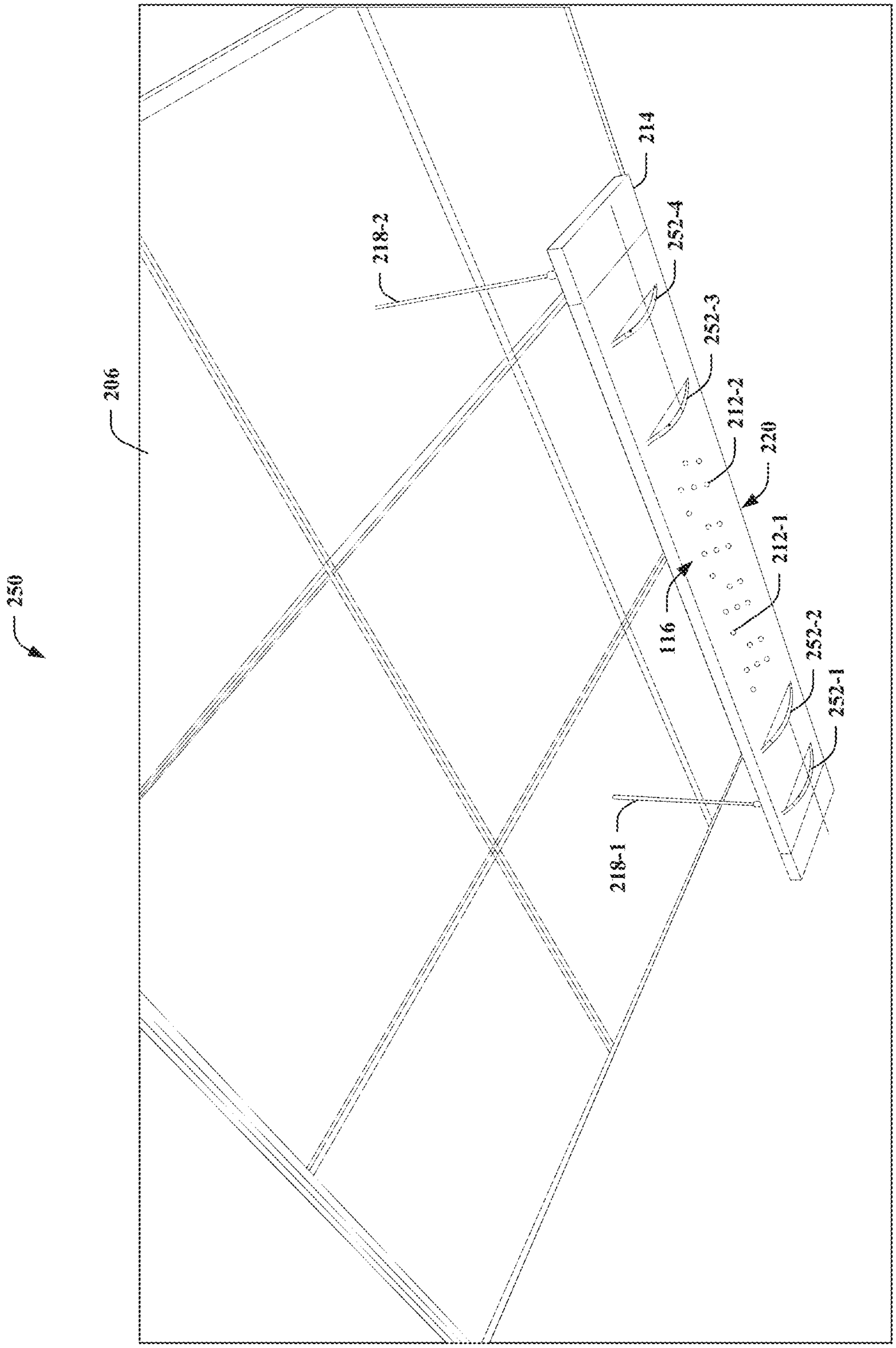
Figure 2F:
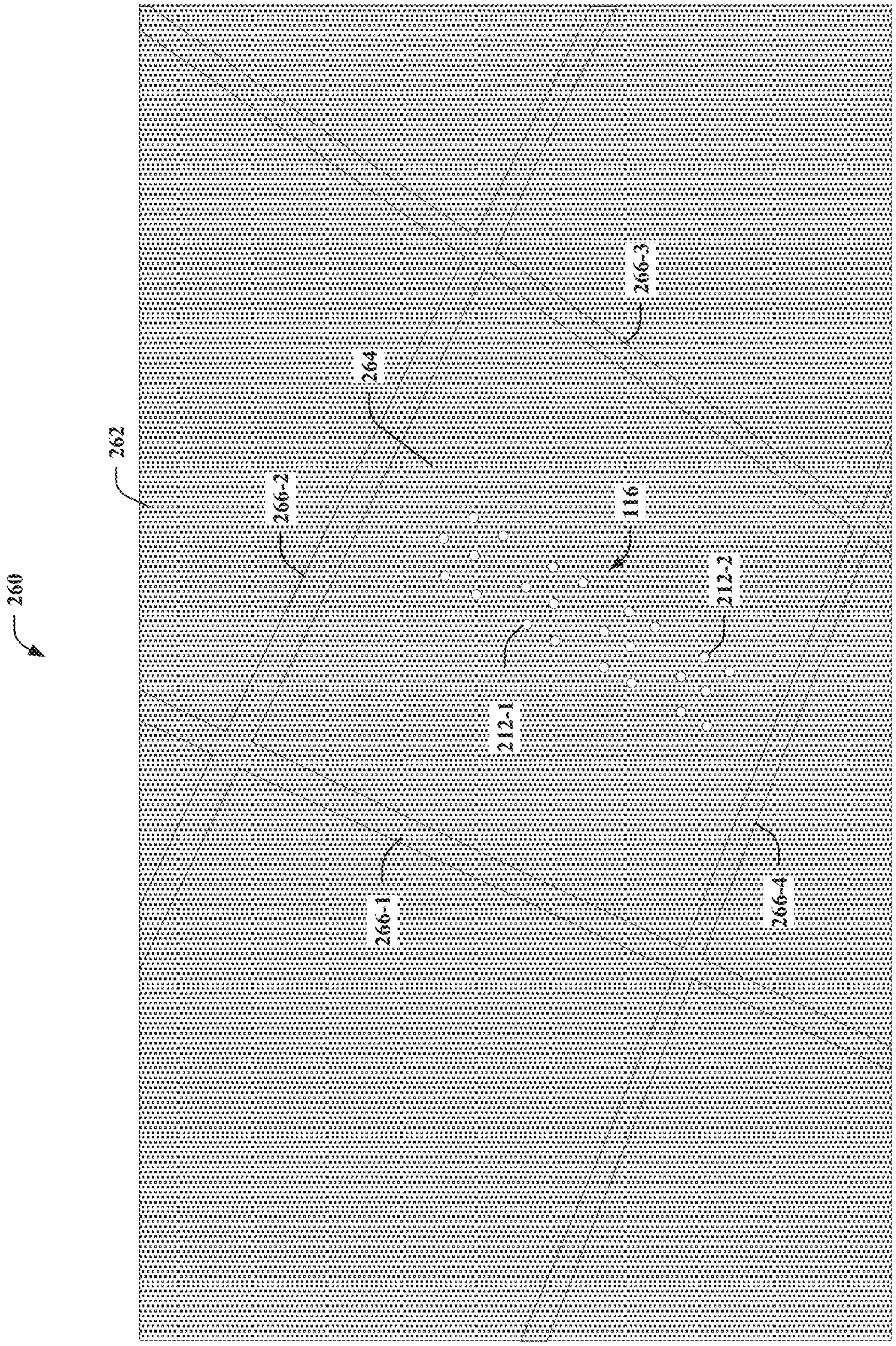

FIGS. 2A to 2J illustrate usage configurations of the beamforming microphone array of FIG. 1A. The Array 116 may be configured and arranged into various usage configurations, such as ceiling mounted, drop-ceiling mounted, wall mounted, etc. In a first example, as shown in FIG. 2A, the Array 116 may be configured and arranged in a ceiling mounted configuration 200, in which the Array 116 may be associated with a spanner post 202 inserted into a ceiling cover plate 204 configured to be in contact with a ceiling 206. In general, the Array 116 may be suspended from the ceiling, such that the audio input signals are received or picked up by one or more microphones in the Array 116 from above an audio source, such as one of the first set of users 104. The Array 116, the spanner post 202, and the ceiling cover plate 204 may be appropriately assembled together using various fasteners such as screws, rivets, etc. known in the art, related art, or developed later. The Array 116 may be associated with additional mounting and installation tools and parts including, but not limited to, position clamps, support rails, array mounting plate, etc. that are well known in the art and may be understood by a person having ordinary skill in the art; and hence, these tools and parts are not discussed in detail elsewhere in this disclosure.

In a second example (FIGS. 2B to 2E), the Array 116 may be combined with one or more utility devices such as lighting fixtures 210, 230, 240, 250. The Array 116 includes the microphones 212-1, 212-2, . . . , **212-*n* that comprise Beamforming Microphones (BFM) 212 operating in the first frequency range, and non-beamforming microphones (not shown) operating in the second frequency range. Any of the lighting fixtures 210, 230, 240, 250 may include a panel 214 being appropriately suspended from the ceiling 206 (or a drop ceiling) using hanger wires or cables such as 218-1 and 218-2 over the first set of users 104 at an appropriate height from the ground. In another approach, the panel 214 may be associated with a spanner post 202 inserted into a ceiling cover plate 204 configured to be in contact with the ceiling 206** in a manner as discussed elsewhere in this disclosure.

The panel 214 may include at least one surface such as a front surface 220 oriented in the direction of an intended entity, e.g., an object, a person, etc., or any combination thereof. The front surface 220 may be substantially flat, though may include other surface configurations such contours, corrugations, depressions, extensions, grilles, and so on, based on intended applications. One skilled in the art will appreciate that the front surface can support a variety of covers, materials, and surfaces. Such surface configurations may provide visible textures that help mask imperfections in the relative flatness or color of the panel 214. The Array 116 is in contact or coupled with the front surface 220.

The front surface 220 may be configured to aesthetically support, accommodate, embed, or facilitate a variety of permanent or replaceable lighting devices of different shapes and sizes. For example, (FIG. 2B), the front surface 220 may be coupled to multiple compact fluorescent tubes (CFTs) 222-1, 222-2, 222-3, and 222-4 (collectively, CFTs 222) disposed transverse to the length of the panel 214. In another example (FIG. 2C), the front surface 220 may include one or more slots or holes (not shown) for receiving one or more hanging lamps 232-1, 232-2, 232-3, 232-4, 232-5, and 232-6 (collectively, hanging lamps 232), which may extend substantially outward from the front surface 220.

In yet another example (FIG. 2D), the front surface 220 may include one or more recesses (not shown) for receiving one or more lighting elements such as bulbs, LEDs, etc. to form recessed lamps 242-1, 242-2, 242-3, and 242-4 (collectively, recessed lamps 242). The lighting elements are concealed within the recess such that the outer surface of the recessed lamps 242 and at least a portion of the front surface 220 are substantially in the same plane. In a further example (FIG. 2E), the panel 214 may include a variety of one or more flush mounts (not shown) known in the art, related art, or developed later. The flush mounts may receive one or more lighting elements (e.g., bulbs, LEDs, etc.) or other lighting devices, or any combination thereof to correspondingly form flush-mounted lamps 252-1, 252-2, 252-3, 252-4 (collectively, flush-mounted lamps 252), which may extend outward from the front surface 220.

Each of the lighting devices such as the CFTs 222, hanging lamps 232, the recessed lamps 242, and the flush-mounted lamps 252 may be arranged in a linear pattern, however, other suitable patterns such as diagonal, random, zigzag, etc. may be implemented based on the intended application. Other examples of lighting devices may include, but not limited to, chandeliers, spotlights, and lighting chains. The lighting devices may be based on various lighting technologies such as halogen, LED, laser, etc. known in the art, related art, and developed later.

The lighting fixtures 210, 230, 240, 250 may be combined with the Array 116 in a variety of ways. For example, the panel 214 may include a geometrical socket (not shown) having an appropriate dimension to substantially receive the Array 116 configured as a standalone unit. The Array 116 may be inserted into the geometrical socket from any side or surface of the panel 214 based on either the panel design or the geometrical socket design. In one instance, the Array 116 may be inserted into the geometrical socket from an opposing side, i.e., the back side, (not shown) of the panel 214. Once inserted, the Array 116 may have at least one surface including the BFMs 212 and the NBFMs being substantially coplanar with the front surface 220 of the panel 214. The Array 116 may be appropriately assembled together with the panel 214 using various fasteners known in the art, related art, or developed later. In another example, the Array 116 may be manufactured to be integrated with the lighting fixtures 210, 230, 240, 250 and form a single unit. The Array 116 may be appropriately placed with the lighting devices to prevent "shadowing" or occlusion of audio pick-up by the BFM 212 and the NBFMs.

The panel 214 may be made of various materials or combinations of materials known in the art, related art, or developed later that are configured to bear the load of the intended number of lighting devices and the Array 116 connected to the panel 214. The lighting fixtures 210, 230, 240, 250 or the panel 214 may be further configured with provisions to guide, support, embed, or connect electrical wires and cables to one or more power supplies to supply power to the lighting devices and the Array 116. Such provisions are well known in the art and may be understood by a person having ordinary skill in the art; and hence, these provisions are not discussed in detail herein.

In a third example (FIGS. 2F to 2I), the Array 116 with BFMs 212 and the NBFMs may be integrated to a ceiling tile for a drop ceiling mounting configuration 260. The drop ceiling 262 is a secondary ceiling suspended below the main structural ceiling, such as the ceiling 206 illustrated in FIGS. 2A-2E. The drop ceiling 262 may be created using multiple drop ceiling tiles, such as a ceiling tile 264, each arranged in a pattern based on (1) a grid design created by multiple support beams 266-1, 266-2, 266-3, 266-4 (collectively, support beams 266) connected together in a predefined manner and (2) the frame configuration of the support beams 266. Examples of the frame configurations for the support beams 266 may include, but are not limited to, standard T-shape, stepped T-shape, and reveal T-shape for receiving the ceiling tiles.

In the illustrated example (FIG. 2F), the grid design may include square gaps (not shown) between the structured arrangement of multiple support beams 266 for receiving and supporting square-shaped ceiling tiles, such as the tile 264. However, the support beams 266 may be arranged to create gaps for receiving the ceiling tiles of various sizes and shapes including, but not limited to, rectangle, triangle, rhombus, circular, and random. The ceiling tiles such as the ceiling tile 264 may be made of a variety of materials or combinations of materials including, but not limited to, metals, alloys, ceramic, fiberboards, fiberglass, plastics, polyurethane, vinyl, or any suitable acoustically neutral or transparent material known in the art, related art, or developed later. Various techniques, tools, and parts for installing the drop ceiling are well known in the art and may be understood by a person having ordinary skill in the art; and hence, these techniques, tools, and parts are not discussed in detail herein.

The ceiling tile 264 may be combined with the Array 116 in a variety of ways. In one embodiment, the ceiling tile 264 may include a geometrical socket (not shown) having an appropriate dimension to substantially receive the Array 116, which integrates the tile and the Array as a standalone unit. The Array 116 may be introduced into the geometrical socket from any side of the ceiling tile 264 based on the geometrical socket design. In one instance, the Array 116 may be introduced into the geometrical socket from an opposing side, i.e., the back side of the ceiling tile 264. The ceiling tile 264 may include a front side 268 (FIG. 2G) and a reverse side 270 (FIG. 2H). The front side 268 may include the Array 116 having BFMs 212 and the NBFMs arranged in a linear fashion.

The reverse side 270 of the ceiling tile 264 may be in contact with a back side of the Array 116. The reverse side 270 of the ceiling tile 264 may include hooks 272-1, 272-2, 272-3, 272-4 (collectively, hooks 272) for securing the Array 116 to the ceiling tile 264. The hooks 272 may protrude away from an intercepting edge of the back side of the Array 116 to meet the edge of the reverse side 270 of the ceiling tile 264, thereby providing a means for securing the Array 116 to the ceiling tile 264. In some embodiments, the hooks 272 may be configured to always curve inwardly towards the front side of the ceiling tile 264, unless moved manually or electromechanically in the otherwise direction, such that the inwardly curved hooks limit movement of the Array 116 to within the ceiling tile 264. In other embodiments, the hooks 272 may be a combination of multiple locking devices or parts configured to secure the Array 116 to the ceiling tile 264. Additionally, the Array 116 may be appropriately assembled together with the ceiling tile 264 using various fasteners known in the art, related art, or developed later. The Array 116 is in contact or coupled with the front surface of ceiling tile 264. In some embodiments, the circuitry for Array 116 is enclosed in a housing that is mounted on the reverse side 270 of the ceiling tile 264.

In some embodiments, the Array 116 may be integrated with the ceiling tile 264 as a single unit such as a ceiling tile microphone for example. Such construction of the unit may be configured to prevent any damage to the ceiling tile 264 due to the load or weight of the Array 116. In some other embodiments, the ceiling tile 264 may be configured to include, guide, support, or connect to various components such as electrical wires, switches, and so on. In further embodiments, ceiling tile 264 may be configured to accommodate multiple arrays. In further embodiments, the Array 116 may be combined or integrated with any other tiles, such as wall tiles, in a manner discussed elsewhere in this disclosure.

Figure 2G:
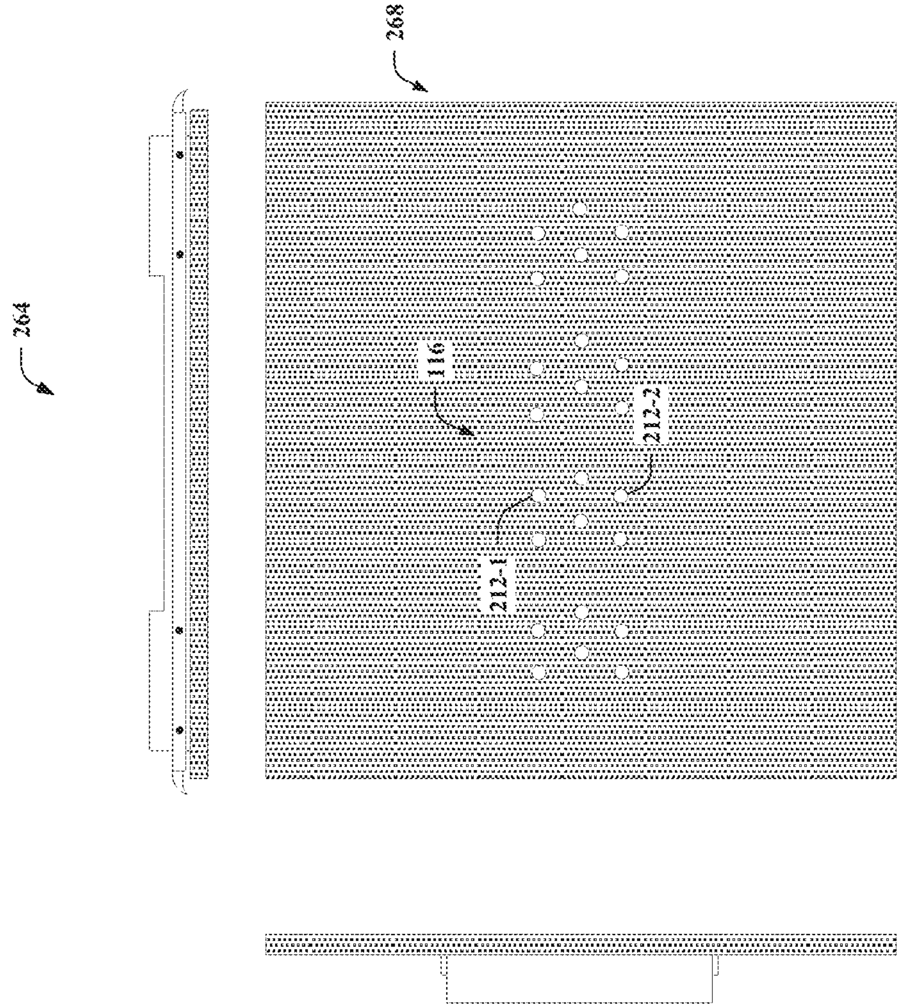
Figure 2H:
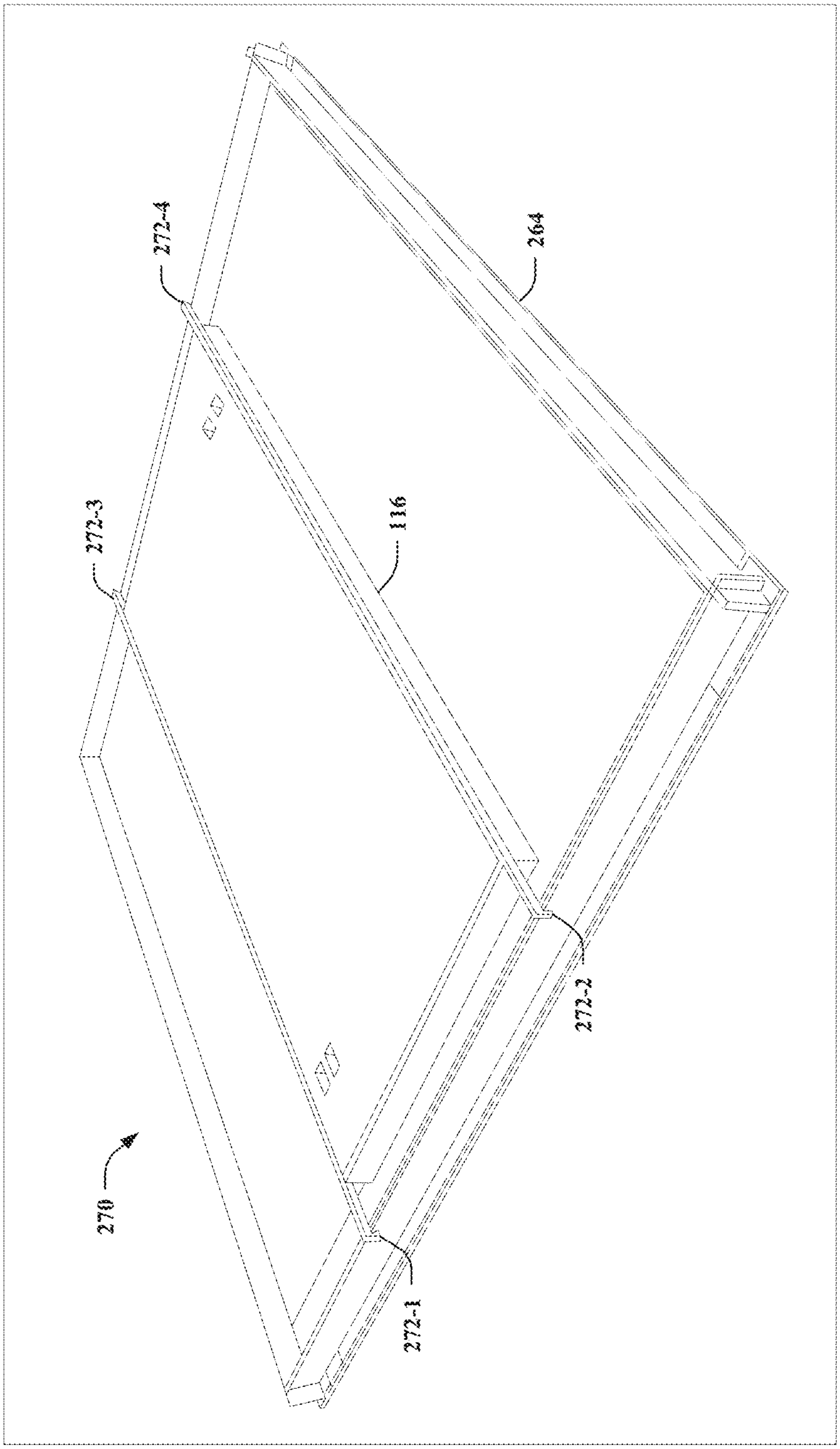
Figure 2I:
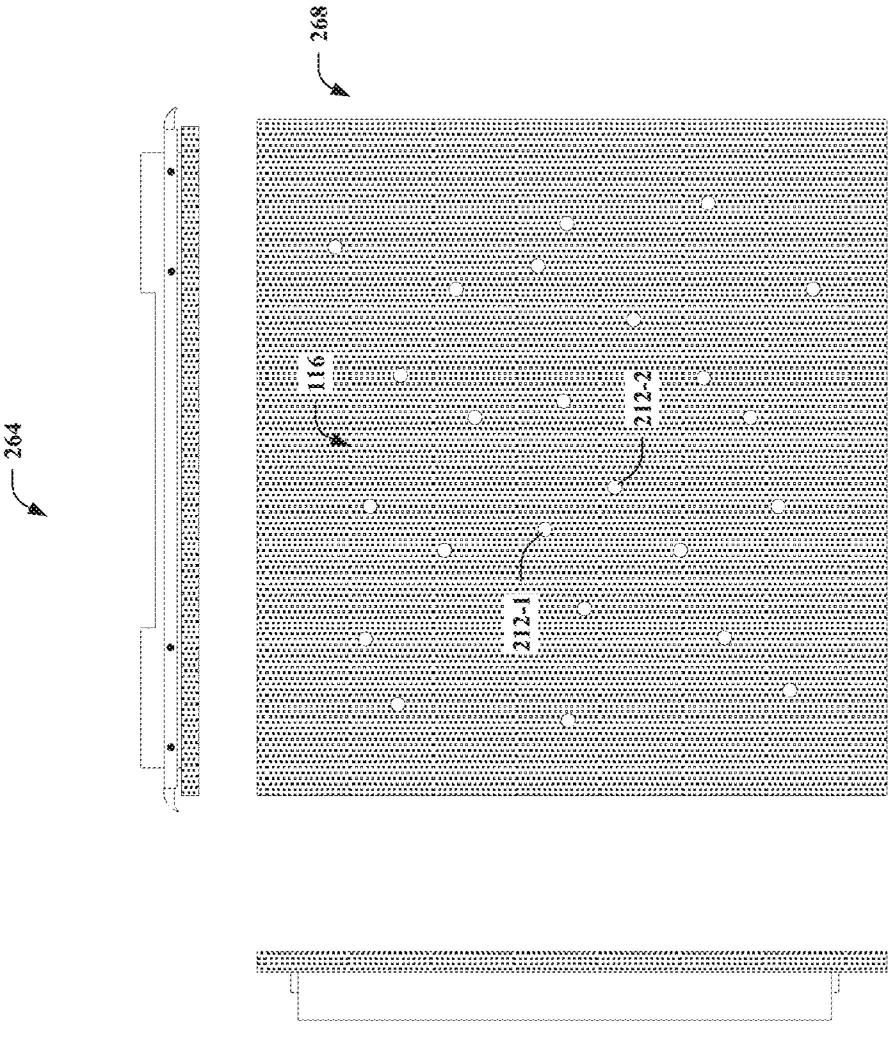
Figure 2J:
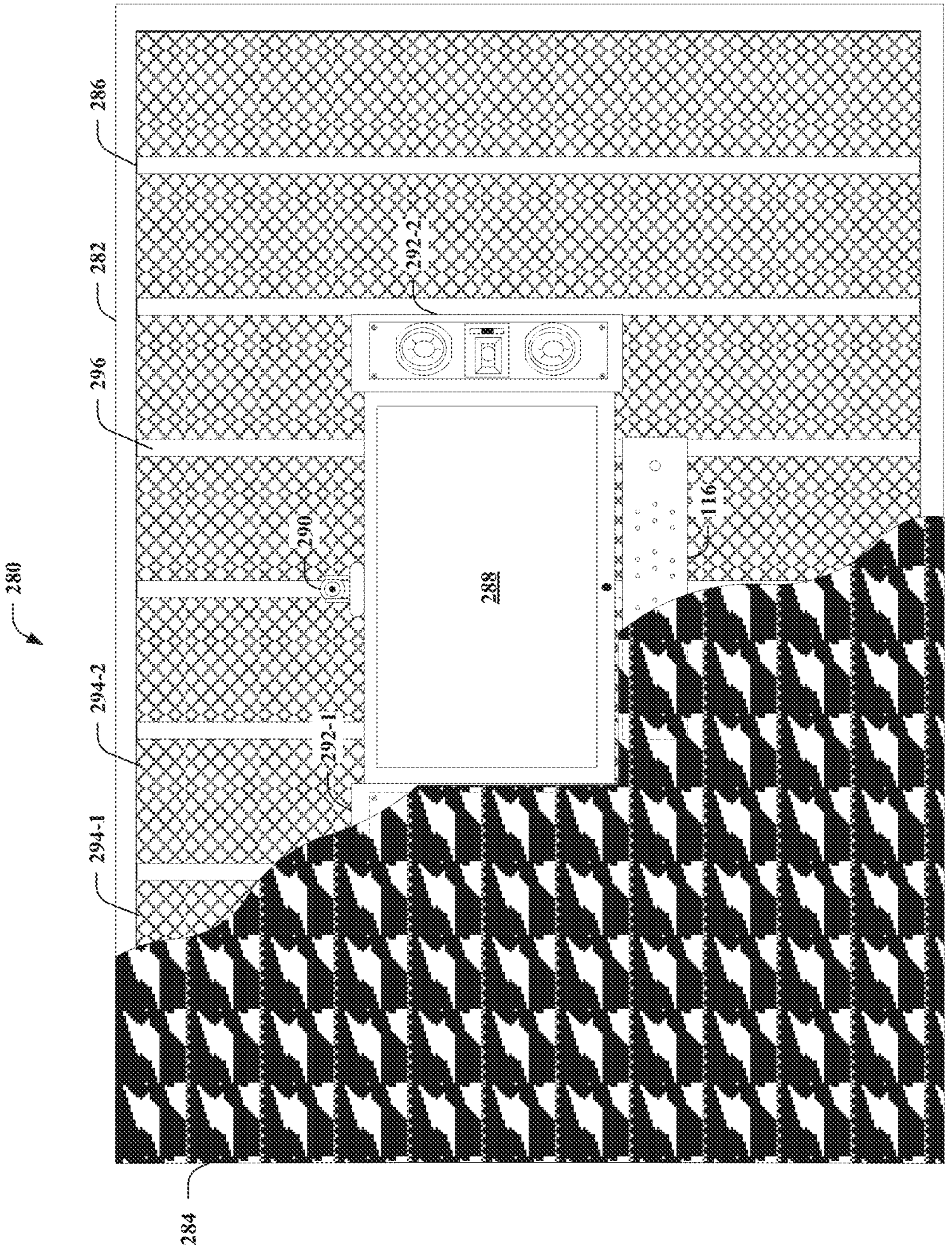

The surface of the front side 268 of the ceiling tile 264 may be coplanar with the front surface of the Array 116 having the microphones of BFM 212 arranged in a linear fashion (as shown in FIG. 2G) or non-linear fashion (as shown in FIG. 2I) on the ceiling tile 264. The temporal delay in receiving audio signals using various non-linearly arranged microphones may be used to determine the direction in which a corresponding sound source is located. For example, a shipping beamformer (not shown) may be configured to include an array of twenty-four microphones in a beamforming microphone array, which may be distributed non-uniformly in a two-dimensional space. The twenty-four microphones may be selectively placed at known locations to design a set of desired audio pick-up patterns. Knowing the configuration of the microphones, such as the configuration shown in BFM 212, may allow for spatial filters being designed to create a desired "direction of look" for multiple audio beams from various sound sources.

Further, the surface of the front side 268 may be modified to include various contours, corrugations, depressions, extensions, color schemes, grilles, and designs. Such surface configurations of the front side 268 provide visible textures that help mask imperfections in the flatness or color of the ceiling tile 264. One skilled in the art will appreciate that the front surface can support a variety of covers, materials, and surfaces. The Array 116 is in contact or coupled with the front side 268.

In some embodiments, the BFMs 212, the NBFMs, or both may be embedded within contours or corrugations, depressions of the ceiling tile 264 or that of the panel 214 to disguise the Array 116 as a standard ceiling tile or a standard panel respectively. In some other embodiments, the BFMs 212 may be implemented as micro electromechanical systems (MEMS) microphones.

In a fourth example (FIG. 2J), the Array 116 may be configured and arranged to a wall mounting configuration (vertical configuration), in which the Array 116 may be embedded in a wall 280. The wall 280 may include an inner surface 282 and an outer surface 284. The Array 116 is in contact or coupled with the outer surface 284. The inner surface 282 may include a frame 286 to support various devices such as a display device 288, a camera 290, speakers 292-1, 292-2 (collectively 292), and the Array 116 being mounted on the frame 286. The frame 286 may include a predetermined arrangement of multiple wall panels 294-1, 294-2, . . . , **294-*n* (collectively, 294). Alternatively, the frame 286 may include a single wall panel. The wall panels 294 may facilitate such mounting of devices using a variety of fasteners such as nails, screws, and rivets, known in the art, related art, or developed later. The wall panels 294** may be made of a variety of materials, e.g., wood, metal, plastic, etc. including other suitable materials known in the art, related art, or developed later.

The multiple wall panels 294 may have a predetermined spacing 296 between them based on the intended installation or mounting of the devices. In some embodiments, the spacing 296 may be filled with various acoustic or vibration damping materials known in the art, related art, or developed later including mass-loaded vinyl polymers, clear vinyl polymers, K-Foam, and convoluted foam, and other suitable materials known in the art, related art, and developed later. These damping materials may be filled in the form of sprays, sheets, dust, shavings, including others known in the art, related art, or developed later. Such acoustic wall treatment using sound or vibration damping materials may reduce the amount of reverberation in the room, such as the first location 102 of FIG. 1A, and lead to better-sounding audio transmitted to far-end room occupants. Additionally, these materials may support an acoustic echo canceller to provide a full duplex experience by reducing the reverberation time for sounds.

In one embodiment, the outer surface 284 may be an acoustically transparent wall covering which can be made of a variety of materials known in the art, related art, or developed later that are configured to provide no or minimal resistance to sound. In one embodiment, the Array 116 and the speakers 292 may be concealed by the outer surface 284 such that the BFMs 212 and the speakers 292 may be in direct communication with the outer surface 284. One advantage of concealing the speakers may be to improve the room aesthetics.

The materials for the outer surface 284 may include materials that are acoustically transparent to the audio frequencies within the frequency range transmitted by the beamformer, but optically opaque so that room occupants, such as the first set of users 104 of FIG. 1A, may be unable to substantially notice the devices that may be mounted behind the outer surface 284. In some embodiments, the outer surface 284 may include suitable wall papers, wall tiles, etc. that can be configured to have various contours, corrugations, depressions, extensions, color schemes, etc. to blend with the décor of the room, such as the first location 102 of FIG. 1A. One skilled in the art will appreciate that the front surface can support a variety of covers, materials, and surfaces.

The combination of wall panels 294 and the outer surface 284 may provide opportunities for third party manufacturers to develop various interior design accessories such as artwork printed on acoustically transparent material with a hidden Array 116. Further, since the Array 116 may be configured for being combined or integrated with various room elements such as lighting fixtures 210, 230, 240, 250, ceiling tiles 264, and wall panels 294, a separate cost of installing the Array 116 in addition to the room elements may be significantly reduced, or completely eliminated. Additionally, the Array 116 may blend in with the room décor, thereby being substantially invisible to the naked eye.

Figure 3:
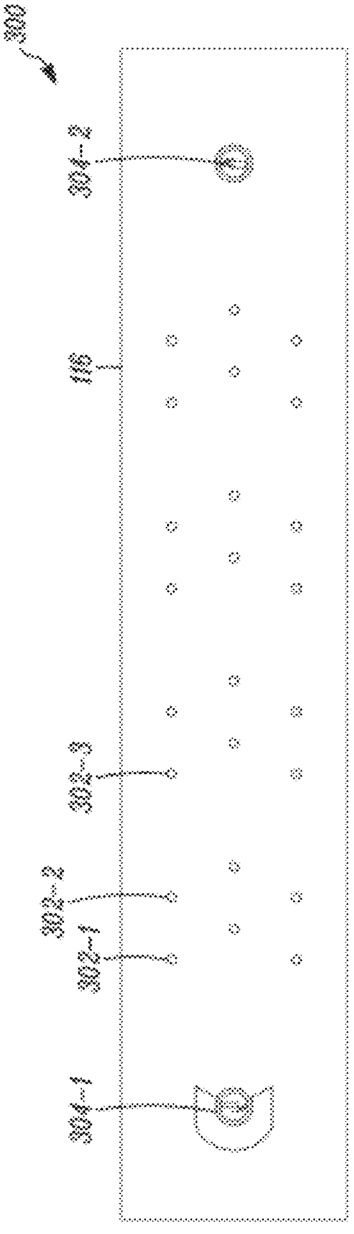
FIG. 3 is a schematic view that illustrates a front side according to an embodiment of the present disclosure.

FIG. 3 is a schematic view that illustrates a first side 300 of the exemplary beamforming microphone array according to the first embodiment of the present disclosure. At the first side 300, the Array 116 may include BFMs and NBFMs (not shown). The microphones 302-1, 302-2, 302-3, **302-*n* that form the Beamforming Microphone Array 302 may be arranged in a specific pattern that facilitates maximum directional coverage of various sound sources in the ambient surrounding. For example, the microphones 302-1, 302-2, 302-3, 302-*n* are arranged in a repeating pattern such as the multiple chevrons illustrated in FIG. 3. A person of ordinary skill in the art will appreciate that other geometrical placements of the microphones are possible. In an embodiment, the Array 116 may include twenty-four microphones of BFM 302 operating in a frequency range 150 Hz to 16 KHz. The Array 302 may operate in such a fashion that it offers a narrow beamwidth of a main lobe on a polar plot in the direction of a particular sound source and improve directionality or gain in that direction. The spacing between each pair of microphones of the Array 302 may be less than half of the shortest wavelength of sound intended to be spatially filtered. Above this spacing, the directionality of the Array 302 would be reduced for the previously described shortest wavelength of sound and large side lobes would begin to appear in the energy pattern on the polar plot in the direction of the sound source. The side lobes indicate alternative directions from which the Array 302 may pick-up noise, thereby reducing the directionality of the Array 302** in the direction of the sound source.

The Beamforming Microphone Array 302 may be configured to pick up and convert the received sounds into audio input signals within the operating frequency range of the Array 302. Beamforming may be used to point one or more beams of the Array 302 towards a particular sound source to reduce interference and improve the quality of the received or picked up audio input signals. The Array 116 may optionally include a user interface having various elements (e.g., joystick, button pad, group of keyboard arrow keys, a digitizer screen, a touchscreen, and/or similar or equivalent controls) configured to control the operation of the Array 116 based on a user input. In some embodiments, the user interface may include buttons 304-1 and 304-2 (collectively, buttons 304), which upon being activated manually or wirelessly may adjust the operation of the BFMs 302 and the NBFMs. For example, the buttons 304-1 and 304-2 may be pressed manually to mute the BFMs 302 and the NBFMs, respectively. The elements such as the buttons 304 may be represented in different shapes or sizes and may be placed at an accessible place on the Array 116. For example, as shown, the buttons 304 may be circular in shape and positioned at opposite ends of the linear Array 116 on the first side 300.

Some embodiments of the user interface may include different numeric indicators, alphanumeric indicators, or non-alphanumeric indicators, such as different colors, different color luminance, different patterns, different textures, different graphical objects, etc. to indicate different aspects of the Array 116. In one embodiment, the buttons 304-1 and 304-2 may be colored red to indicate that the respective BFMs 302 and the NBFMs are muted.

Figure 4A:
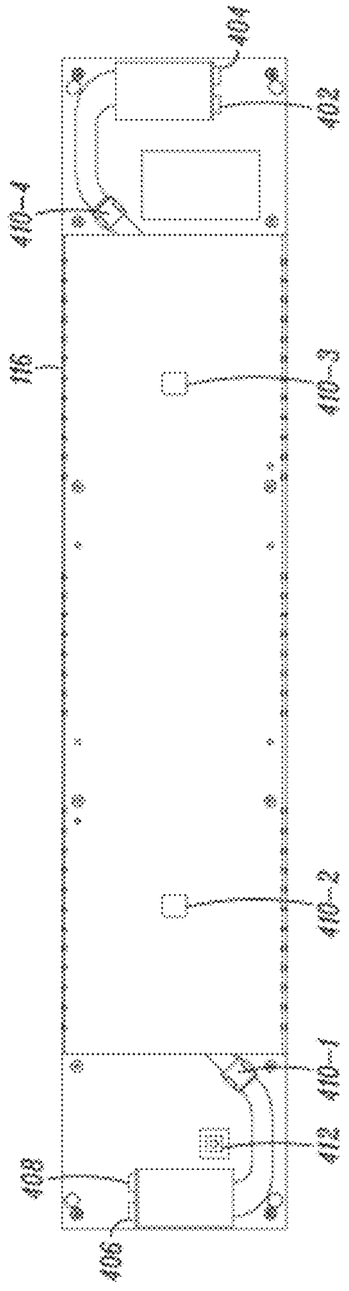
FIG. 4A is a schematic view that illustrates a back side according to an embodiment of the present disclosure.
Figure 4B:
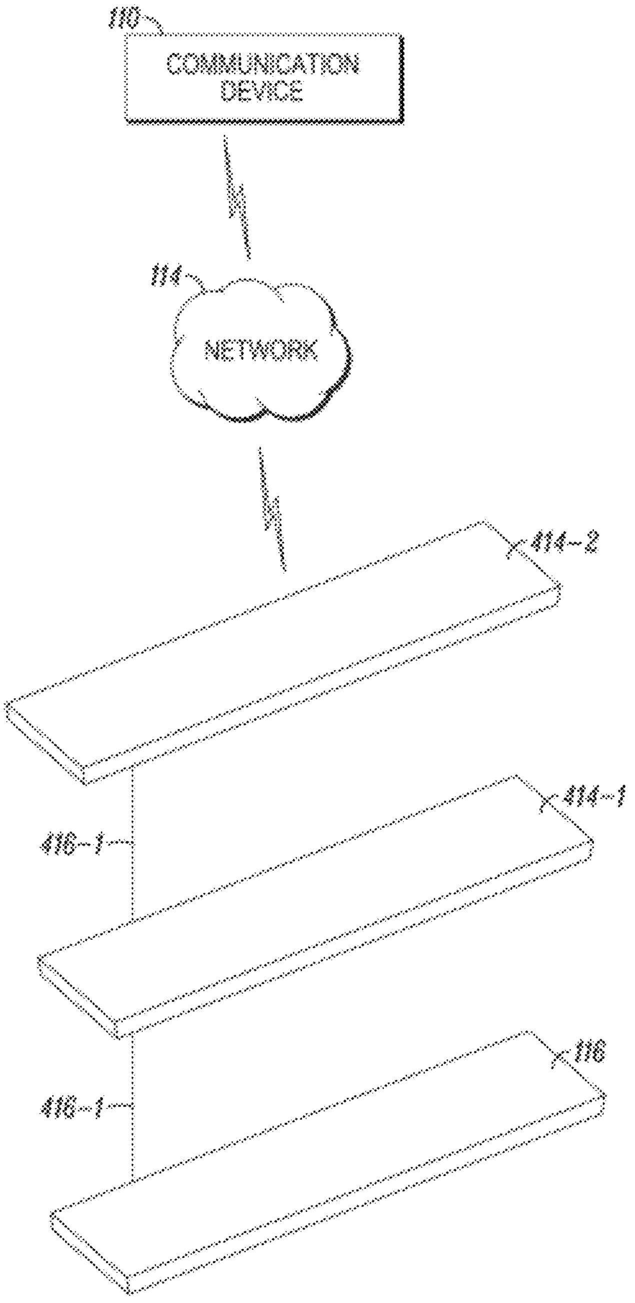
FIG. 4B is a schematic view that illustrates multiple arrays connected to each other according to an embodiment of the present disclosure.

FIG. 4A is a schematic view that illustrates a second side 400 of the beamforming microphone array of the present disclosure. At the second side 400, the Array 116 may include a link-in expansion bus (E-bus) connection 402, a link-out E-bus connection 404, a USB input port 406, a power-over-Ethernet (POE) connector 408, retention clips 410-1, 410-2, 410-3, 410-4 (collectively, retention clips 410), and a device selector 412. In one embodiment, the Array 116 may be connected to the first communication device 110 through a suitable cable, such as CATS-24AWG solid conductor RJ45 cable, via the link-in E-bus connection 402. The link-out E-bus connection 404 may be used to connect the Array 116 using the cable to another Array. The E-bus may be connected to the link-out connection 404 of the Array 116 and the link-in connection 402 of another Array. In a similar manner, multiple Arrays may be connected together using multiple cables for connecting each pair of the arrays. Additionally, the E-bus may connect Array 116 to other devices that include an auto mixer such as a CONVERGE PRO or other audio/conferencing mixers with comparable features. In an exemplary embodiment, as shown in FIG. 4B, the Array 116 may be connected to a first auxiliary Array 414-1 and a second auxiliary Array 414-2 in a daisy chain arrangement. The Array 116 may be connected to the first auxiliary Array 414-1 using a first cable 416-1, and the first auxiliary Array 414-1 may be connected to the second auxiliary Array 414-2 using a second cable 416-2. The number of Arrays being connected to each other (such as, to perform an intended operation with desired performance) may depend on processing capability and compatibility of a communication device, such as the first communication device 110, associated with at least one of the connected Arrays.

Further, the first communication device 110 may be updated with appropriate firmware to configure the multiple Arrays connected to each other or each of the Arrays being separately connected to the first communication device 110. The USB input support port 406 may be configured to receive audio signals from any compatible device using a suitable USB cable.

The Array 116 may be powered through a standard Power over Ethernet (POE) switch or through an external POE power supply. An appropriate AC cord may be used to connect the POE power supply to the AC power. The POE cable may be plugged into the LAN+DC connection on the power supply and connected to the POE connector 408 on the Array 116. After the POE cables and the E-bus(s) are plugged to the Array 116, they may be secured under the cable retention clips 410.

The device selector 412 may be configured to interface a communicating Array, such as the Array 116, to the first communication device 110. For example, the device selector 412 may assign a unique identity (ID) to each of the communicating Arrays, such that the ID may be used by the first communication device 110 to interact with or control the corresponding Array. The device selector 412 may be modeled in various formats. Examples of these formats include, but are not limited to, an interactive user interface, a rotary switch, etc. In some embodiments, each assigned ID may be represented as any of the indicators such as those mentioned above for communicating to the first communication device or for displaying at the arrays. For example, each ID may be represented as hexadecimal numbers ranging from ‘0’ to ‘F’.

Figure 5:
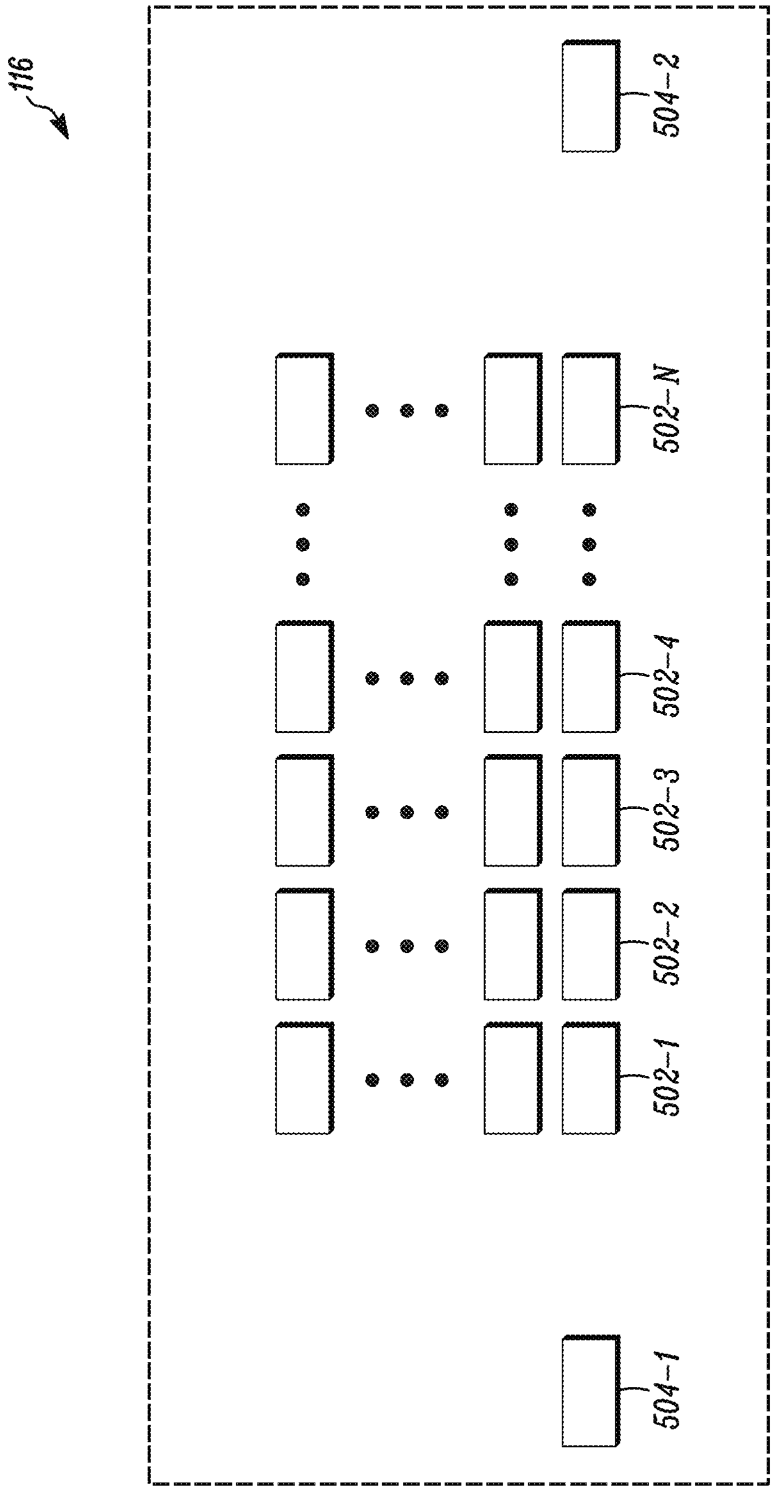
FIG. 5 is a schematic view that illustrates an arrangement of microphones in a beamforming microphone array.

FIG. 5 is a schematic that illustrates arrangement of microphones in the band-limited beamforming array of FIG. 1, according to an embodiment of the present disclosure. The Array 116 may include a number of microphones including multiple BFMs such as 502-1, 502-2, 502-3, 502-4, **502-*n* (collectively, BFMs 502) and the NBMs 504-1 and 504-2 (collectively, NBMs 504). Each of the microphones such as the BFMs 502 and the NBMs 504 may be arranged in a predetermined pattern that facilitates maximum coverage of various sound sources in the ambient surrounding. In one embodiment, the BFMs 502 and the NBMs 504 may be arranged in a linear fashion, such that the BFMs 502 have maximum directional coverage of the surrounding sound sources. However, one of ordinary skill in the art would understand that the NBMs 504 may be arranged in various alignments with respect to the BFMs 502 based on at least one of the acoustics of the ambient surrounding, such as in a room, and the desired pick-up pattern of the NBMs 504**.

Each of the microphones 502, 504 may be arranged to receive sounds from various sound sources located at a far field region and configured to convert the received sounds into audio input signals. The BFMs 502 may be configured to resolve the audio input signals within a first frequency range based on a predetermined separation between each pair of the BFMs 502. On the other hand, the NBMs 508 may be configured to resolve the audio input signals within a second frequency range. The lowest frequency of the first frequency range may be greater than the lowest frequency of the second frequency range. Both the BFMs 502 and the NBMs 502 may be configured to operate within a low frequency range. In one embodiment, the first frequency range corresponding to the BFMs 502 may be 150 Hz to 16 KHz, and the second frequency range corresponding to the NBMs 504 may be 16 KHz to 20 KHz. However, the pick-up pattern of the BFMs 502 may differ from that of the NBMs 504 due to their respective unidirectional and omnidirectional behaviors.

The BFMs 502 may be implemented as any one of the analog and digital microphones such as carbon microphones, fiber optic microphones, dynamic microphones, electret microphones, MEMS microphones, etc. In some embodiments, the band-limited array 116 may include at least two BFMs, though the number of BFMs may be further increased to improve the strength of desired signal in the received audio input signals. The NBMs 504 may also be implemented as a variety of microphones such as those mentioned above. In one embodiment, the NBMs 504 may be cardioid microphones placed at opposite ends of a linear arrangement of the BFMs 506 and may be oriented so that they are pointing outwards. The cardioid microphone has the highest sensitivity and directionality in the forward direction, thereby reducing unwanted background noise from being picked-up within its operating frequency range, for example, the second frequency range. Although the shown embodiment includes two NBMs 504, one with ordinary skill in the art may understand that the band-limited array 116 may be implemented using only one non-beamforming microphone.

Figure 6:
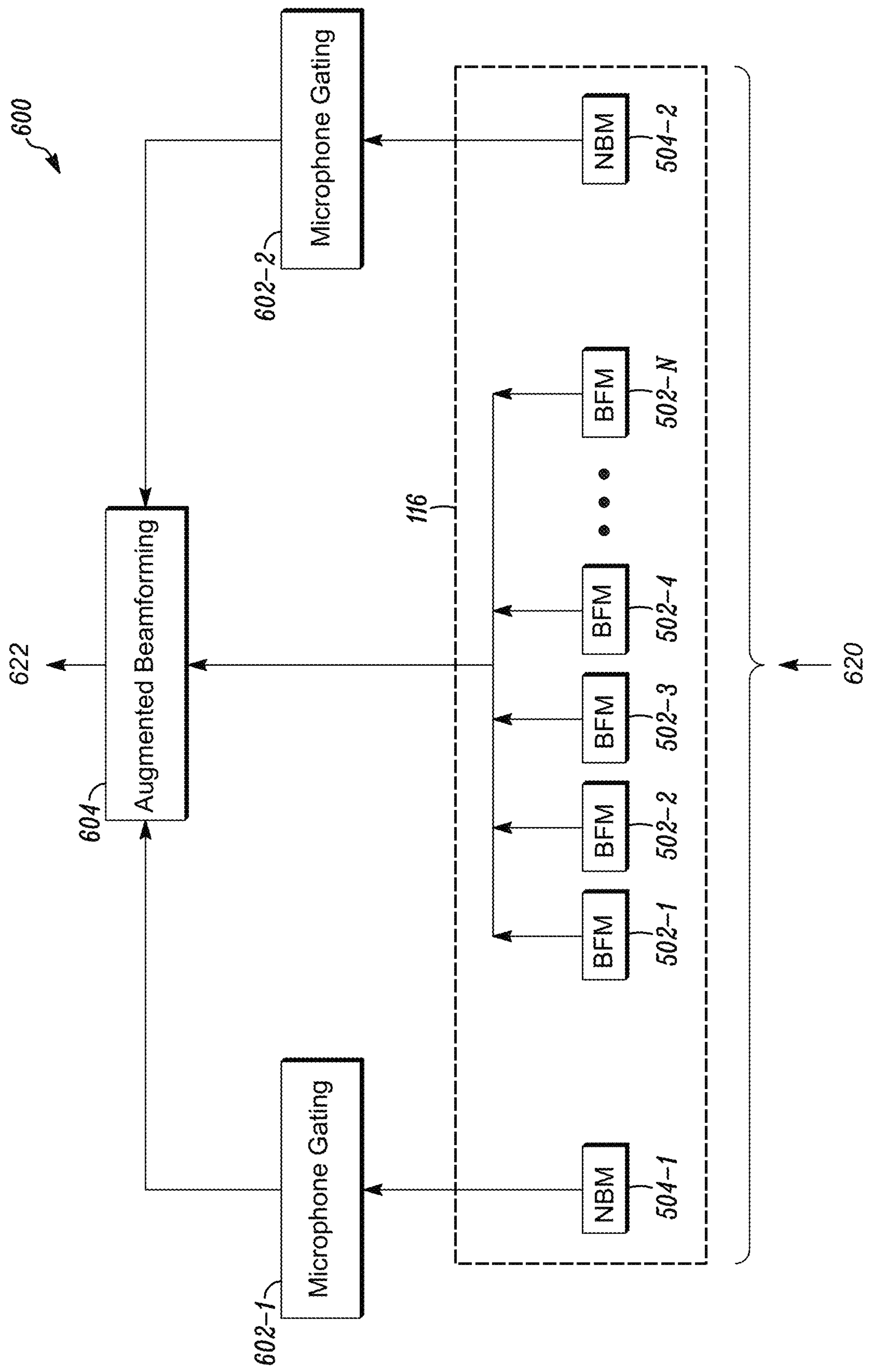
FIG. 6 is a schematic view that illustrates a system for implementing a beamforming microphone array.

FIG. 6 is a schematic that illustrates a system 600 for implementing an embodiment of a beamforming microphone array according to the present disclosure. The system 600 has input signal 620 and output signal 622 and includes the Array 116, microphone gating algorithm blocks 602-1, 602-2 (collectively, microphone gating algorithm blocks 602), and the augmented beamforming block 604. The microphone gating algorithm blocks use a microphone gating algorithm that is designed to apply attenuation to the microphone that is not pointing in the direction of the local talker. The use of microphone gating reduces undesired audio artifacts such as excessive noise and reverberation. The Array 116 may include multiple BFMs such as the BFMs 502 and the NBMs 504 arranged in a linear fashion as discussed in the description of FIG. 5. The BFMs 502 and the NBMs 504 may be configured to convert the received sounds into audio input signals.

The microphone gating algorithm blocks 602 may be configured to apply attenuation to the audio input signals from at least one of the NBMs 504, such as the NBM 504-1, whose directionality, i.e., gain, towards a desired sound source is relatively lesser than that of the other, such as the NBM 504-2, within the human hearing frequency range (i.e., 20 Hz to 20 KHz). In an embodiment, the microphone gating algorithm blocks 602 may be configured to restrict the second frequency range corresponding to the non-beamforming microphone (having lesser directionality towards a particular sound source) based on one or more threshold values. Such restricting of the second frequency range may facilitate (1) extracting the audio input signals within the human hearing frequency range, and (2) controlling the amount of each of the non-beamforming signal applied to the augmented beamforming block 504, using any one of various microphone gating techniques known in the art, related art, or later developed.

Each of the one or more threshold values may be predetermined based on the intended bandpass frequency window, such as the human hearing frequency range, to perform beamforming. In one embodiment, at least one of the predetermined threshold values may be the lowest frequency or the highest frequency of the first frequency range at which the BFMs 502 are configured to operate. In one embodiment, if the threshold value is the lowest frequency (i.e., 20 Hz) of the first frequency range, the microphone gating algorithm blocks 602 may be configured to restrict the second frequency range between 20 Hz and 150 Hz. In another embodiment, if the threshold value is the highest frequency (i.e., 16 KHz) of the first frequency range, the microphone gating algorithm blocks 602 may be configured to limit the second frequency range between 16 KHz and 20 KHz.

In another embodiment, the microphone gating algorithm blocks 602 may be configured to restrict the second frequency range based on a first threshold value and a second threshold value. For example, if the first threshold value is the highest frequency (i.e., 16 KHz) of the first frequency range and the second threshold value is the highest frequency (i.e., 20 KHz) of the human hearing frequency range, the microphone gating algorithm blocks 602 may restrict the second frequency range between 16 KHz to 20 KHz. Accordingly, the microphone gating algorithm blocks 602 may output the audio input signals within the restricted second frequency range (hereinafter referred to as restricted audio input signals). One skilled in the art will appreciate that these blocks are performing a filtering function in addition to a gating function.

The augmented beamforming block 604 may be configured to perform beamforming on the received audio input signals within a predetermined bandpass frequency range or window. In an embodiment, the augmented beamforming block 604 may be configured to perform beamforming on the received audio input signals from the BFMs 502 within the human hearing frequency range using the restricted audio input signals from the microphone gating algorithm blocks 602.

The audio input signals from the BFMs 502 and the NBMs 504 may reach the augmented beamforming block 604 at a different temporal instance as the NBMs 504 as they only provide low frequency coverage. As a result, the audio input signals from the NBMs 504 may be out of phase with respect to the audio input signals from BFMs 502. The augmented beamforming block 604 may be configured to control amplitude and phase of the received audio input signals within an augmented frequency range to perform beamforming. The augmented frequency range refers to the bandpass frequency range that is a combination of the operating first frequency range of the BFMs 502 and the restricted second frequency range generated by the microphone gating algorithm blocks 602.

The augmented beamforming block 604 may adjust side lobe audio levels and steering of the BFMs 502 by assigning complex weights or constants to the audio input signals within the augmented frequency range received from each of the BFMs 502. The complex constants may shift the phase and set the amplitude of the audio input signals within the augmented frequency range to perform beamforming using various beamforming techniques such as those mentioned above. Accordingly, the augmented beamforming block 604 may generate an augmented beamforming signal within the bandpass frequency range. In some embodiments, the augmented beamforming block 604 may generate multiple augmented beamforming signals based on combination of the restricted audio input signals and the audio input signals from various arrangements of the BFMs 502.

This present disclosure enables the full range of human hearing to be captured and transmitted by the combined set of BFMs 502 and NBMs 504 while minimizing the physical size of the band-limited array 116, and simultaneously allowing the cost to be reduced as compared to existing beamforming array designs and approaches that perform beamforming throughout the entire frequency range of human hearing.

While the present disclosure has been described in this disclosure regarding certain illustrated and described embodiments, those of ordinary skill in the art will recognize and appreciate that the present disclosure is not so limited. Rather, many additions, deletions, and modifications to the illustrated and described embodiments may be made without departing from the true scope of the invention, its spirit, or its essential characteristics as claimed along with their legal equivalents. In addition, features from one embodiment may be combined with features of another embodiment while still being encompassed within the scope of the invention as contemplated by the inventor. The described embodiments are to be considered only as illustrative and not restrictive. All changes which come within the meaning and range of equivalency of the claims are to be embraced within their scope. Disclosing the present invention is exemplary only, with the true scope of the present invention being determined by the included claims.

The invention claimed is:

1. A ceiling tile microphone, comprising:

a plurality of microphones coupled together as a microphone array used for beamforming, the plurality of microphones are positioned at predetermined locations and produce audio signals to be used to form a directional pickup pattern;

a single ceiling tile with an outer surface on the front side of the ceiling tile where the outer surface is acoustically transparent, the microphone array couples to the back side of the single ceiling tile, the microphone array combines with the ceiling tile as a single unit, the single unit is mountable in a drop ceiling in place of a single ceiling tile included in the drop ceiling, all or part of the single unit is in the drop space of the drop ceiling when the single unit is used in a drop ceiling mounting configuration;

where the ceiling tile microphone further includes beamforming, acoustic echo cancellation, and auto mixing.

2. The ceiling tile microphone of claim 1 that further includes auto voice tracking.

3. The ceiling tile microphone of claim 1 that further includes Power over Ethernet.

4. The ceiling tile microphone of claim 1 that further includes a configurable pickup pattern for the beamforming.

5. The ceiling tile microphone of claim 1 where auto mixing includes one or more of the following parameters: number of open microphones (NOM), first mic priority mode, last mic mode, maximum number of mics mode, ambient level, gate threshold adjust, off attenuation, adjust hold time, and decay rate.

6. The ceiling tile microphone of claim 1 that further includes adjustable noise cancellation.

7. The ceiling tile microphone of claim 1 that further includes one or more additional non-beamforming microphone(s) configured to resolve audio input signals from the non-beamforming microphone(s).

8. The ceiling tile microphone of claim 1 where all of the plurality microphones of the microphone array are disposed behind the outer surface of the single ceiling tile and in a common housing.

9. The ceiling tile microphone of claim 8 that further includes an ethernet connector on the exterior of the common housing and is configured to receive power for the microphone array through the ethernet connector.

10. The ceiling tile microphone of claim 1 where adaptive acoustic processing automatically adjusts a beamforming operation of the microphone array to a room configuration and is configured to create an audio beam over a predetermined frequency range based on the predetermined locations.

11. The ceiling tile microphone of claim 1 that further includes a USB port.

12. A method of manufacturing a ceiling tile microphone, comprising:

coupling a plurality of microphones together as a microphone array used for beamforming, the plurality of microphones are positioned at predetermined locations and produce audio signals to be used to form a directional pickup pattern;

combining a single ceiling tile with an outer surface on the front side of the ceiling tile where the outer surface is acoustically transparent with the microphone array as a single unit, the microphone array couples to the back side of the single ceiling tile, the single unit is mountable in a drop ceiling in place of a single ceiling tile included in the drop ceiling, all or part of the single unit is in the drop space of the drop ceiling when the single unit is used in a drop ceiling mounting configuration;

where the ceiling tile microphone further includes beamforming, acoustic echo cancellation, and auto mixing.

13. The method of claim 12 where the beamforming microphone array includes auto voice tracking.

14. The method of claim 12 where the beamforming microphone array includes Power over Ethernet.

15. The method of claim 12 where the beamforming microphone array includes a configurable pickup pattern for the beamforming.

16. The method of claim 12 where auto mixing includes one or more of the following parameters: number of open microphones (NOM), first mic priority mode, last mic mode, maximum number of mics mode, ambient level, gate threshold adjust, off attenuation, adjust hold time, and decay rate.

17. The method of claim 12 where the beamforming microphone array includes adjustable noise cancellation.

18. The method of claim 12 that further includes one or more additional non-beamforming microphone(s) configured to resolve audio input signals from the non-beamforming microphone(s).

19. The method of claim 12 where all of the plurality microphones of the microphone array are disposed behind the outer surface of the single ceiling tile and in a common housing.

20. The method of claim 19 where the ceiling tile microphone includes an ethernet connector on the exterior of the common housing and is configured to receive power for the microphone array through the ethernet connector.

21. The method of claim 12 where adaptive acoustic processing automatically adjusts a beamforming operation of the microphone array to a room configuration and is configured to create an audio beam over a predetermined frequency range based on the predetermined locations.

22. The method of claim 12 that further includes a USB port.

23. A method of using a ceiling tile microphone, comprising:

producing audio signals to be used to form a directional pickup pattern with a plurality of microphones coupled together as a microphone array used for beamforming, the plurality of microphones are positioned at predetermined locations;

a single ceiling tile with an outer surface on the front side of the ceiling tile where the outer surface is acoustically transparent, the microphone array couples to the back side of the single ceiling tile, the microphone array combines with the ceiling tile as a single unit, the single unit is mountable in a drop ceiling in place of a single ceiling tile included in the drop ceiling, all or part of the single unit is in the drop space of the drop ceiling when the single unit is used in a drop ceiling mounting configuration;

where the ceiling tile microphone further includes beamforming, acoustic echo cancellation, and auto mixing.

24. The method of claim 23 that further includes auto voice tracking.

25. The method of claim 23 that further includes Power over Ethernet.

26. The method of claim 23 that further includes a configurable pickup pattern for the beamforming.

27. The method of claim 23 where auto mixing includes one or more of the following parameters: number of open microphones (NOM), first mic priority mode, last mic mode, maximum number of mics mode, ambient level, gate threshold adjust, off attenuation, adjust hold time, and decay rate.

28. The method of claim 23 that further includes adjustable noise cancellation.

29. The method of claim 23 that further includes one or more additional non-beamforming microphone(s) configured to resolve audio input signals from the non-beamforming microphone(s).

30. The ceiling tile microphone of claim 23 where all of the plurality microphones of the microphone array are disposed behind the outer surface of the single ceiling tile and in a common housing.

31. The ceiling tile microphone of claim 30 that further includes an ethernet connector on the exterior of the common housing and is configured to receive power for the microphone array through the ethernet connector.

32. The ceiling tile microphone of claim 23 where adaptive acoustic processing automatically adjusts a beamforming operation of the microphone array to a room configuration and is configured to create an audio beam over a predetermined frequency range based on the predetermined locations.

33. The ceiling tile microphone of claim 23 that further includes a USB port.

34. A ceiling tile microphone, comprising:

means for producing audio signals using a directional pickup pattern formed by a plurality of microphones coupled together as a microphone array used for beamforming, the plurality of microphones are positioned at predetermined locations;

a single ceiling tile with an outer surface on the front side of the ceiling tile where the outer surface is acoustically transparent, the microphone array couples to the back side of the single ceiling tile, the microphone array combines with the ceiling tile as a single unit, the single unit is mountable in a drop ceiling in place of a single ceiling tile included in the drop ceiling, all or part of the single unit is in the drop space of the drop ceiling when the single unit is used in a drop ceiling mounting configuration;

where the ceiling tile microphone further includes beamforming, acoustic echo cancellation, and auto mixing.

35. The ceiling tile microphone of claim 34 that further includes auto voice tracking.

36. The ceiling tile microphone of claim 34 that further includes Power over Ethernet.

37. The ceiling tile microphone of claim 34 that further includes a configurable pickup pattern for the beamforming.

38. The ceiling tile microphone of claim 34 where auto mixing includes one or more of the following parameters: number of open microphones (NOM), first mic priority mode, last mic mode, maximum number of mics mode, ambient level, gate threshold adjust, off attenuation, adjust hold time, and decay rate.

39. The ceiling tile microphone of claim 34 that further includes adjustable noise cancellation.

40. The ceiling tile microphone of claim 34 that further includes one or more additional non-beamforming microphone(s) configured to resolve audio input signals from the non-beamforming microphone(s).

41. The ceiling tile microphone of claim 34 where all of the plurality microphones of the microphone array are disposed behind the outer surface of the single ceiling tile and in a common housing.

42. The ceiling tile microphone of claim 41 that further includes an ethernet connector on the exterior of the common housing and is configured to receive power for the microphone array through the ethernet connector.

43. The ceiling tile microphone of claim 34 where adaptive acoustic processing automatically adjusts a beamforming operation of the microphone array to a room configuration and is configured to create an audio beam over a predetermined frequency range based on the predetermined locations.

44. The ceiling tile microphone of claim 34 that further includes a USB port.

* * * * *